(12) United States Patent
Kishida et al.

(10) Patent No.: US 11,722,035 B2
(45) Date of Patent: Aug. 8, 2023

(54) ELECTRIC MOTOR WITH REVERSE INPUT CUTOFF CLUTCH

(71) Applicant: NSK LTD., Tokyo (JP)

(72) Inventors: Hirotaka Kishida, Fujisawa (JP); Toshirou Toyoda, Maebashi (JP); Yuya Daikoku, Fujisawa (JP)

(73) Assignee: NSK LTD., Tokyo (JP)

( * ) Notice: Subject to any disclaimer, the term of this patent is extended or adjusted under 35 U.S.C. 154(b) by 308 days.

(21) Appl. No.: 17/274,869

(22) PCT Filed: Sep. 11, 2019

(86) PCT No.: PCT/JP2019/035708
§ 371 (c)(1),
(2) Date: Mar. 10, 2021

(87) PCT Pub. No.: WO2020/054763
PCT Pub. Date: Mar. 19, 2020

(65) Prior Publication Data
US 2022/0060084 A1 Feb. 24, 2022

(30) Foreign Application Priority Data
Sep. 12, 2018 (JP) ................. 2018-170564

(51) Int. Cl.
*H02K 7/10* (2006.01)
*H02K 7/108* (2006.01)
(Continued)

(52) U.S. Cl.
CPC ............. *H02K 7/108* (2013.01); *H02K 7/083* (2013.01); *F16D 41/10* (2013.01)

(58) Field of Classification Search
CPC ......... H02K 7/108; H02K 7/083; F16D 41/10
(Continued)

(56) References Cited

U.S. PATENT DOCUMENTS 3,587,796 A 6/1971 Nestvogel
2012/0098367 A1 4/2012 Mizutani et al.
(Continued)

FOREIGN PATENT DOCUMENTS

JP 2004-84918 A 3/2004
JP 2006-042465 A 2/2006
(Continued)

OTHER PUBLICATIONS

International Search Report for PCT/JP2019/035708, dated Nov. 5, 2019.
(Continued)

*Primary Examiner* — Terrance L Kenerly
(74) *Attorney, Agent, or Firm* — Sughrue Mion, PLLC

(57) ABSTRACT

The electric motor with a reverse input cutoff clutch has an output shaft. The output shaft is configured by connecting a first shaft and a second shaft that are coaxially arranged with each other via the reverse input cutoff clutch. The second shaft is rotatably supported to a housing by one radial bearing. The reverse input cutoff clutch has a function that, when rotational torque is inputted to the first shaft, transmits the rotational torque inputted to the first shaft to the second shaft, and when rotational torque is reversely inputted to the second shaft, completely cuts off the rotational torque reversely inputted to the second shaft, and does not transmit the rotational torque to the first shaft, or transmits a part of the rotational torque to the first shaft, and cuts off the remaining part.

11 Claims, 23 Drawing Sheets

(51) Int. Cl.
*H02K 7/08* (2006.01)
*F16D 41/10* (2006.01)

(58) Field of Classification Search
USPC .......................................................... 310/78
See application file for complete search history.

(56) References Cited

U.S. PATENT DOCUMENTS

2015/0061436 A1* 3/2015 Fujiwara .................. H02K 7/08
                                                                                   310/78
2016/0347349 A1* 12/2016 Yamamoto ............. B62D 1/195

FOREIGN PATENT DOCUMENTS

| JP | 2007-16878 A   | 1/2007  |
|----|----------------|---------|
| JP | 2007-232095 A  | 9/2007  |
| JP | 2010-276166 A  | 12/2010 |
| JP | 2011-27252 A   | 2/2011  |
| JP | 2013-46522 A   | 3/2013  |
| JP | 2017-20612 A   | 1/2017  |

OTHER PUBLICATIONS

Extended European Search Report dated May 2, 2022 in European Application No. 19859177.8.

* cited by examiner

ELECTRIC MOTOR WITH REVERSE INPUT CUTOFF CLUTCH

CROSS REFERENCE TO RELATED APPLICATIONS

This application is a National Stage of International Application No. PCT/JP2019/035708 filed Sep. 11, 2019, claiming priority based on Japanese Patent Application No. 2018-170564 filed Sep. 12, 2018.

TECHNICAL FIELD

The present invention relates to an electric motor that includes a reverse input cutoff clutch.

BACKGROUND ART

In an electric actuator such as that of an electric door, an electric power window of an automobile, or the like, an electric motor is used as a drive source, and a displacement member such as a door, a window or the like is displaced based on the rotational force of the electric motor. In an electric actuator used for an electric door, an electric power window of an automobile, or the like, it is necessary to maintain the position of the displacement member regardless of the forces acting on the displacement member such as the weight of the window itself, and the like. Even when a displacement operation for displacing the displacement member is not performed, as long as the electric motor is energized and exerts a rotational force, the position of the displacement member may be maintained regardless of the forces acting on the displacement member; however, this is disadvantageous from the aspect of saving energy. The position of the displacement member may be maintained by giving the worm reducer that reduces the rotational force of the electric motor a self-locking function; however, in this case, there is a possibility that the positive efficiency will become low, that it will be necessary to use a large electric motor, and that the entire device may become large.

JP 2007-016878A describes a structure of an electric actuator in which a reverse input cutoff clutch is provided between an output shaft of an electric motor and a screw shaft that are arranged in parallel. The reverse input cutoff clutch includes a function of transmitting the torque from the output shaft of the electric motor to the screw shaft; however, completely cuts off and does not transmit torque from the screw shaft to the output shaft. Therefore, in the electric actuator described in JP 2007-16878A, the position of the nut arranged around the screw shaft may be maintained without energizing the electric motor.

JP 2007-232095A and JP 2004-084918A describe the structure of a locking-type reverse input cutoff clutch. The locking-type reverse input cutoff clutch includes a function that, when rotational torque is reversely inputted to the output member, prevents rotation of the output member by causing rolling bodies that are arranged in a wedge-shaped space between an inner member and an outer member to move toward a side of the wedge-shaped space having a narrower width in the radial direction, and become wedged between the inner member and the outer member.

CITATION LIST

Patent Literature

Patent Literature 1: JP 2007-016878A
Patent Literature 2: JP 2007-232095A
Patent Literature 3: JP 2004-084918A

SUMMARY OF INVENTION

Technical Problem

However, in the electric actuator described in JP 2007-016878A, the input member and the output member of the reverse input cutoff clutch are arranged in parallel with the output shaft of the electric motor. Therefore, in addition to a bearing for rotatably supporting the output shaft of the electric motor with respect to the housing, bearings for rotatably supporting each of the input member and the output member of the reverse input cutoff clutch are required. Therefore, there is room for improvement in terms of downsizing the electric actuator.

Note that, in the structure described in JP 2007-016878A, in a case where the output shaft of the electric motor and the reverse input cutoff clutch are arranged in series at specified positions, it is necessary to connect the output shaft of the motor to the input member of the clutch by engaging a male serration provided on one of the output shaft of the electric motor and the input member of the reverse input cutoff clutch with a female serration provided on the other of the output shaft of the electric motor and the input member of the reverse input cutoff clutch. The work of engaging the male serration and the female serration is performed manually; however, when doing this, the central axis of the output shaft of the motor and the central axis of the input member of the clutch are shifted, and the tip-end portions of the male serration and/or the female serration may come into contact with other members or the like, and may cause damage such as deformation to the male serration and/or the female serration. As a result, it becomes difficult to engage the male serration and the female serration, and it becomes difficult to engage the output shaft of the motor and the input member of the clutch. In order to prevent the occurrence of damage to the male and/or female serrations, it is necessary to perform axis alignment work to ensure that the central axis of the output shaft of the motor and the central axis of the input member of the clutch are aligned, which is disadvantageous in terms of improving the efficiency of assembly work.

In view of the circumstances described above, it is an object of the present invention to achieve a structure of an electric motor with a reverse input cutoff clutch that may easily be downsized.

Solution to Problem

The electric motor with reverse input cutoff clutch of the present invention includes a housing, an output shaft, one radial bearing, a rotor, and a stator.

The output shaft has a first shaft that is rotatably supported inside of the housing; a second shaft that is coaxially arranged with the first shaft; and a reverse input cutoff clutch that is arranged inside the housing and connects the first shaft and the second shaft.

The reverse input cutoff clutch has a function that, in a case where rotational torque is inputted to the first shaft, transmits the rotational torque that is inputted to the first shaft to the second shaft, and in a case where rotational torque is reversely inputted to the second shaft, completely cuts off the rotational torque that is reversely inputted to the second shaft, or transmits a part of the rotational torque that is reversely inputted to the second shaft to the first shaft, and cuts off the remaining part.

The one radial bearing rotatably supports the second shaft with respect to the housing.

The rotor is arranged around the first shaft and integrally rotates with the first shaft.

The stator is arranged around the rotor and supported by and fixed to the housing.

The one radial bearing is preferably configured by a radial rolling bearing, and more preferably is configured by a single-row deep groove ball bearing.

One shaft of the first shaft and the second shaft has a cylindrical shaft-side concave portion in a central portion of an end surface in the axial direction, the other shaft of the first shaft and the second shaft has a shaft-side convex portion that internally fits in the shaft-side concave portion with no looseness in the radial direction so that relative rotation is possible.

Alternatively, one shaft of the first shaft and the second shaft has a cylindrical shaft-side concave portion in a central portion of an end surface in the axial direction, the other shaft of the first shaft and the second shaft has a shaft-side convex portion that is inserted inside in the shaft-side concave portion, and the output shaft has a rolling bearing arranged between the inner-circumferential surface of the shaft-side concave portion and the outer-circumferential surface of the shaft-side convex portion.

The housing preferably includes a first housing element that stores the stator; a second housing element that stores the reverse input cutoff clutch, and a housing positioning means for positioning the first housing element and the second housing element in the radial direction. In this case, the housing positioning means preferably includes an uneven fitting portion of a housing-side concave portion of one housing element of the first housing element and the second housing element, and a housing-side convex portion of the other housing element of the first housing element and the second housing element.

The reverse input cutoff clutch may include:

a pressed surface;

an input portion that integrally rotates with the first shaft;

an output portion that is coaxially arranged with the input portion, and integrally rotates with the second shaft; and an engaging element that, in a case where rotational torque is inputted to the input portion, moves in a direction away from the pressed surface due to engagement with the input portion, and by engaging with the output portion, transmits the rotational torque inputted to the input portion to the output portion; and in a case where rotational torque is reversely inputted to the output portion, moves in a direction approaching the pressed surface due to engagement with the output portion, and by coming in contact with the pressed surface, completely cuts off the rotational torque reversely inputted to the output portion, or transmits a part of the rotational torque reversely inputted to the output portion and cuts off the remaining part.

The engaging element may be arranged between the pressed surface and an output-portion-side engaging portion that is provided on the output portion; and an input-portion-side engaging portion that is provided in a portion of the input portion that is separated in the radial direction from the rotation center may be engaged with an engaging-element-side input engaging portion that is provided on the engaging element so that the engaging-element-side input engaging portion is able to move away from or toward the pressed surface.

The engaging element may include a plurality of engaging elements that are arranged so as to hold the output-portion-side engaging portion from outside in the radial direction.

Moreover, the engaging element may include a pair of engaging elements that are arranged so as to hold the output-portion-side engaging portion from outside in the radial direction by bottom surfaces thereof.

Preferably, the input portion is integrally formed with the first shaft, and the output portion is integrally formed with the second shaft.

Preferably, the housing is configured so as to have the pressed surface on an inner-circumferential surface thereof.

Effect of Invention

In the electric motor with reverse input cutoff clutch of the present invention, the output shaft is configured by connecting the first shaft and the second shaft, which are coaxially arranged with each other, via the reverse input cutoff clutch, and thus when compared with the structure described in JP 2007-016878A, downsizing may be easily performed. In particular, the electric motor with reverse input cutoff clutch of the present invention rotatably supports the second shaft with respect to the housing by a single radial bearing, and thus downsizing may be performed even more easily.

Furthermore, with the electric motor with reverse input cutoff clutch of the present invention, the first shaft may be integrally configured with the input portion of the reverse input cutoff clutch. Additionally, or alternatively, the second shaft may be integrally configured with the output portion of the reverse input cutoff clutch. From these aspects as well, downsizing may be easily performed when compared with the structure described in JP 2007-016878A.

DESCRIPTION OF EMBODIMENTS

First Example

Figure 1:
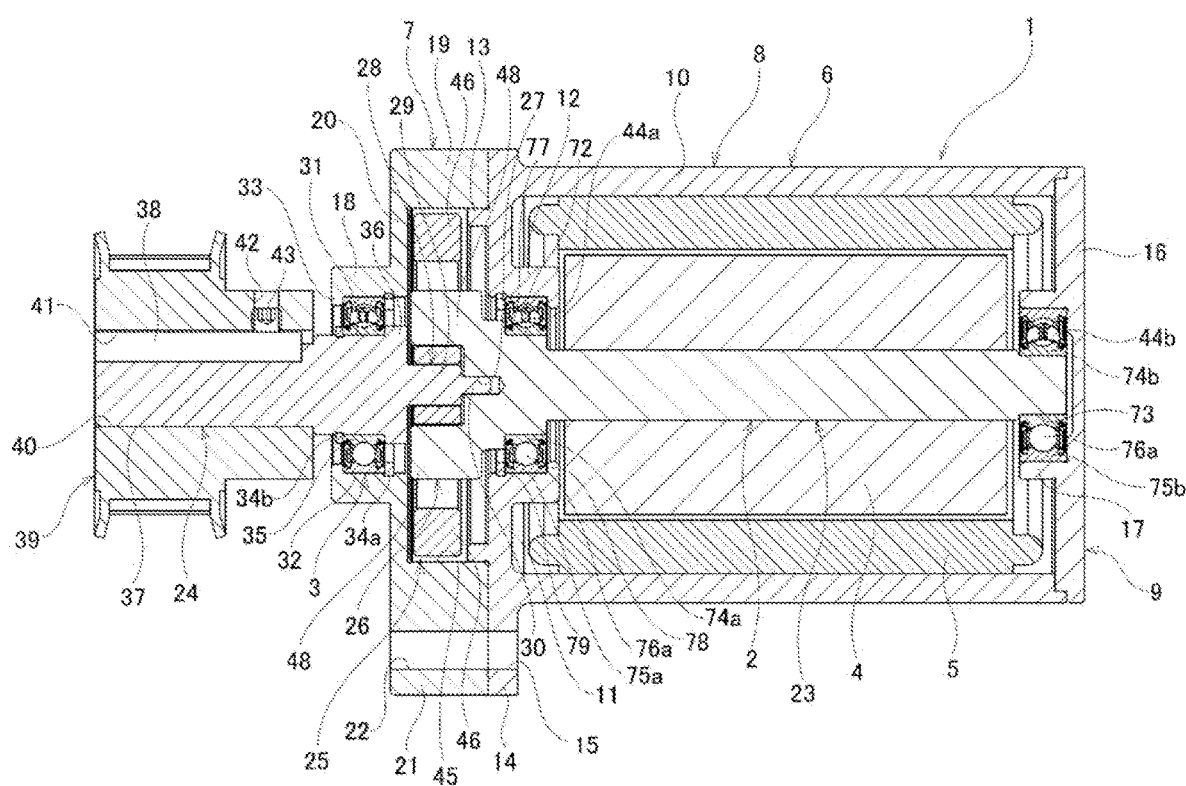
FIG. 1 is a cross-sectional view illustrating an electric motor with a reverse input cutoff clutch according to a first example of an embodiment of the present invention.
Figure 2:
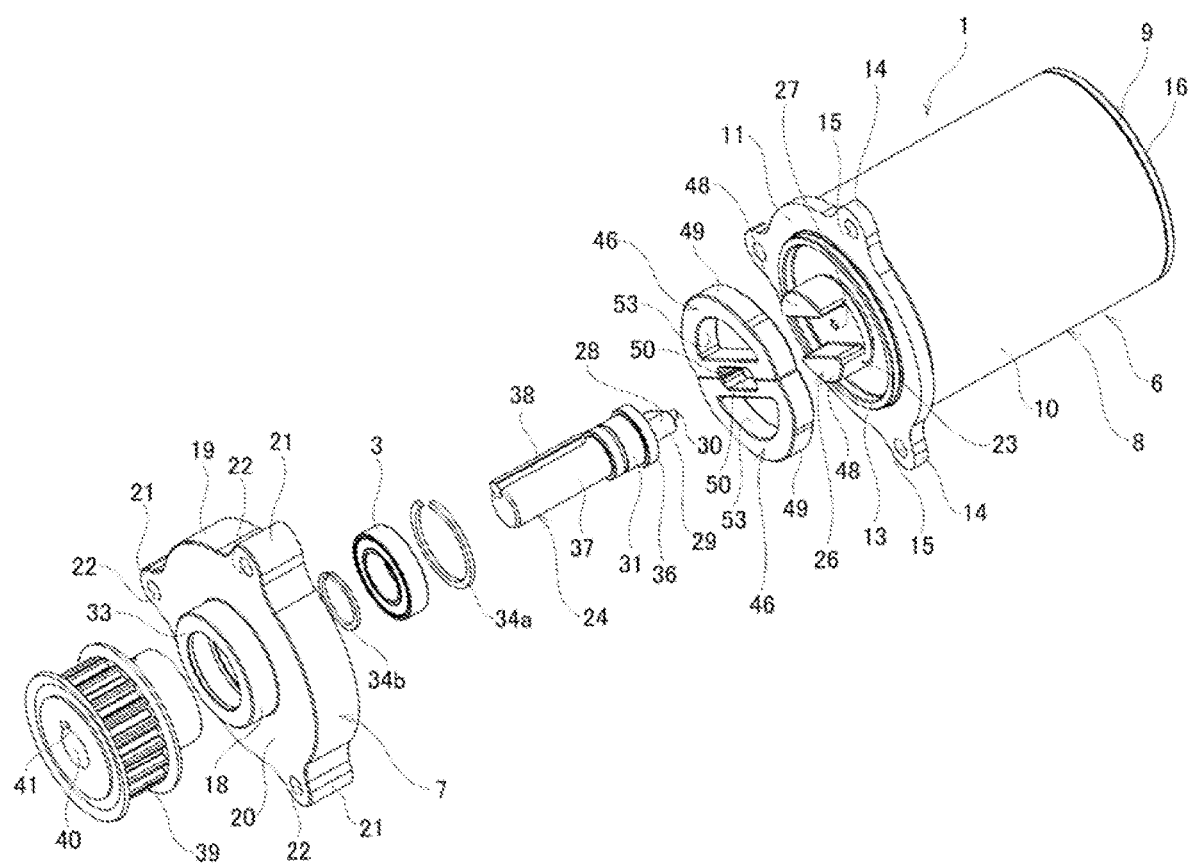
FIG. 2 is an exploded perspective view of the electric motor with a reverse input cutoff clutch according to the first example.
Figure 3:
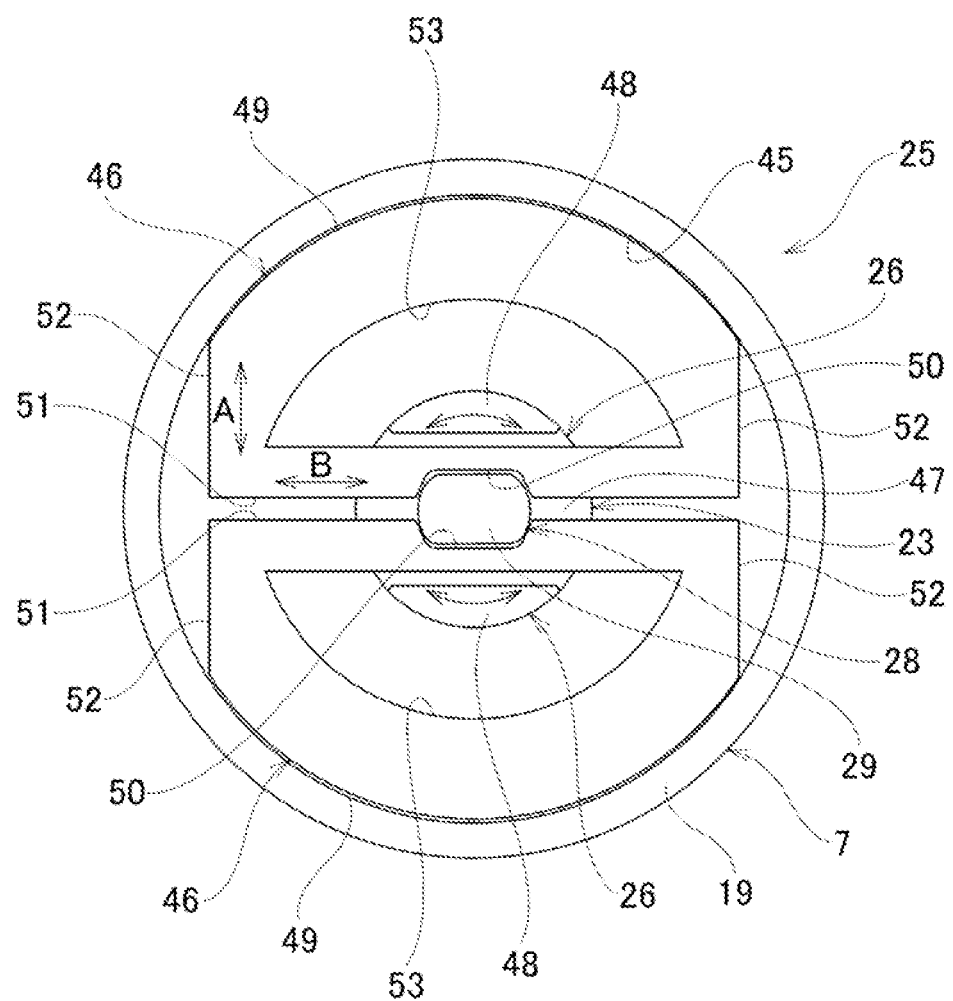
FIG. 3 is a cross-sectional view of a reverse input cutoff clutch taken out from the electric motor of the first example.
Figure 4:
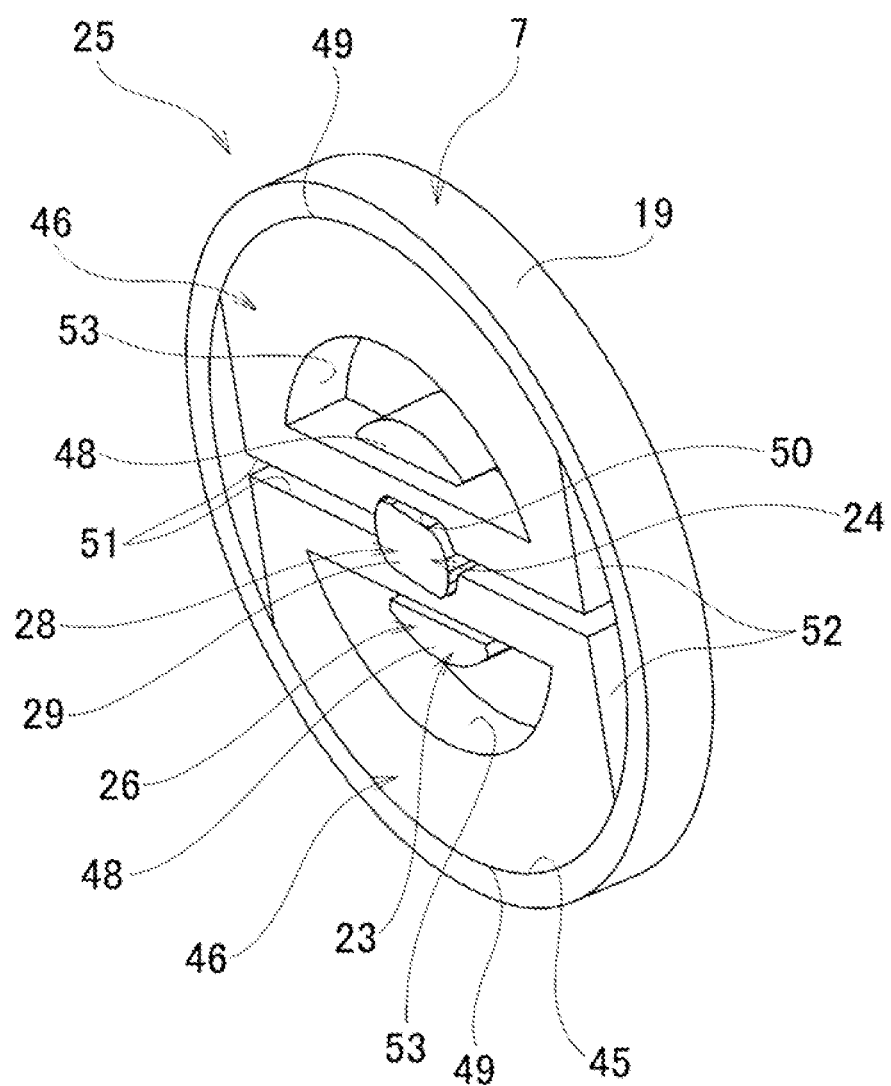
FIG. 4 is a perspective view the reverse input cutoff clutch of the first example.

FIG. 1 to FIG. 11 illustrate a first example of an embodiment of the present invention. The electric motor with a reverse input cutoff clutch of this example includes a housing 1, an output shaft 2, one radial bearing 3, a rotor 4, and a stator 5.

The housing 1 includes a first housing element 6 and a second housing element 7.

The first housing element 6 includes a main body portion 8 and a lid portion 9.

The main body portion 8 includes: a cylindrical portion 10; a circular ring portion 11 that is bent toward the inside in the radial direction from an end portion on one side (left side in FIG. 1) in the axial direction of the cylindrical portion 10; a holding cylindrical portion 12 that is bent toward the other side (right side in FIG. 1) from the end portion on the inside in the radial direction of the circular ring portion 11; and a ridge 13 that protrudes toward the one side in the axial direction from the middle portion in the radial direction of a side surface on the one side in the axial direction of the circular ring portion 11 around the entire circumference.

The main body portion 8 further includes first flange portions 14 protruding outward in the radial direction from a plurality of locations in the circumferential direction (three locations in the illustrated example) on the outer-circumferential surface of the circular ring portion 11, and circular holes 15 penetrating each of the first flange portions 14 in the axial direction. The lid portion 9 includes a disc-shaped bottom plate portion 16 that closes an opening portion on the other side in the axial direction of the cylindrical portion 10 of the main body portion 8, and a holding cylindrical portion 17 that protrudes from the surface on the one side in the axial direction of the bottom plate portion 16. The lid portion 9 is fixed to the end portion on the other side in the axial direction of the cylindrical portion 10 of the main body portion 8 by fixing means such as welding, screws, or the like, and covers the opening portion on the other side in the axial direction of the cylindrical portion 10.

The second housing element 7 includes a small-diameter cylindrical portion 18 on the one side in the axial direction, a large-diameter cylindrical portion 19 on the other side in the axial direction, and a side plate portion 20 connecting the small-diameter cylindrical portion 18 and the large-diameter cylindrical portion 19. The second housing element 7 includes second flange portions 21 protruding outward in the radial direction from a plurality of locations (three locations in the illustrated example) in the circumferential direction on the outer-circumferential surface of the large-diameter cylindrical portion 19, and screw holes 22 that penetrate the second flange portions 21 in the axial direction.

In this example, by fitting (in-row fitting) the outer-circumferential surface of the ridge 13 of the first housing element 6 inside the inner-circumferential surface of the end portion of the other side in the axial direction of the large-diameter cylindrical portion 19 of the second housing element 7 without looseness, the first housing element 6 and the second housing element 7 may be positioned in the radial direction. In other words, in this example, the ridge 13 corresponds to a housing-side convex portion, the inner-circumferential surface of the end portion on the other side in the axial direction of the large-diameter cylindrical portion 19 corresponds to a housing-side concave portion, and an uneven fitting portion between the outer-circumferential surface of the ridge 13 and the inner-circumferential surface of the end portion on the other side in the axial direction of the large-diameter cylindrical portion 19 corresponds to a housing positioning means.

The first housing element 6 and the second housing element 7 are fastened together by inserting bolts (not illustrated) through the circular holes 15 of the first flange portions 14, then screwing the bolts into the screw holes 22 of the second flange portions 21 and tightening to form the housing 1.

The output shaft 2 includes: a first shaft 23 that is rotatably supported on the inside of the housing 1; a second shaft 24 that is coaxially arranged with the first shaft 23; and a reverse input cutoff clutch 25 that is arranged inside the housing 1 and connects the first shaft 23 and the second shaft 24.

The first shaft 23 is rotatably supported inside the first housing element 6 of the housing 1 by a pair of bearings 44a, 44b. Of the pair of bearings 44a, 44b, the bearing 44a on the one side in the axial direction is arranged between the inner-circumferential surface of the holding cylindrical portion 12 of the main body portion 8 and the outer-circumferential surface of an intermediate-diameter portion 72 arranged in an intermediate portion in the axial direction of the first shaft 23, and the bearing 44b on the other side in the axial direction is arranged between the inner-circumferential surface of the holding cylindrical portion 17 of the lid portion 9 and the outer-circumferential surface of a small-diameter portion 73 arranged at the end portion on the other side in the axial direction of the first shaft 23. Note that in this example, single-row deep groove ball bearings are used as the bearings 44a, 44b, respectively.

The bearing 44a on the one side in the axial direction includes an inner ring 74a, an outer ring 75a, and a plurality of rolling bodies (balls) 76a rotatably arranged between the inner ring 74a and the outer ring 75a. The inner ring 74a is externally fitted onto the outer-circumferential surface of the intermediate-diameter portion 72 of the first shaft 23, and the end surface on the one side in the axial direction comes in contact with a stepped surface 77 existing on one end portion in the axial direction of the intermediate-diameter portion 72. The outer ring 75a is internally fitted inside the inner-circumferential surface of the holding cylindrical portion 12 of the main body portion 8, and is held from both sides in the axial direction between an inward-facing flange 78 existing on the end portion on the other side in the axial direction of the holding cylindrical portion 12 and a retaining ring 79 that is fixed to the inner-circumferential surface of the holding cylindrical portion 12.

The bearing 44b on the other side in the axial direction includes an inner ring 74b, an outer ring 75b, and a plurality of rolling bodies (balls) 76b rotatably arranged between the inner ring 74b and the outer ring 75b. The inner ring 74b is externally fitted to the outer-circumferential surface of the small-diameter portion 73 of the first shaft 23 by an interference fit. The outer ring 75b is fitted and fixed to the inner-circumferential surface of the holding cylindrical portion 17 of the lid portion 9 by an interference fit.

The first shaft 23 includes an input portion 26 of the reverse input cutoff clutch 25 (described later) at an end portion on the one side in the axial direction (a portion existing further on the one side in the axial direction than the portion around which the bearing 44a on the one side in the axial direction is externally fitted), and includes a cylindrical shaft-side concave portion 27 in the central portion of the end surface on the one side in the axial direction.

The second shaft 24 includes an output portion 28 of the reverse input cutoff clutch 25 at the end portion on the other side in the axial direction, and includes a cylindrical shaft-side convex portion 30 that protrudes axially from the central portion of the end surface on the other side in the axial direction of the output-portion-side engaging portion 29 of the output portion 28. The second shaft 24 is coaxially arranged with the first shaft 23 by internally fitting (in-row fitting) the shaft-side convex portion 30 inside the shaft-side concave portion 27 of the first shaft 23 without looseness in the radial direction.

The second shaft 24 further includes a support shaft portion 31 at an intermediate portion in the axial direction. The support shaft portion 31 of the second shaft 24 is rotatably supported with respect to the housing 1 by the radial bearing 3. In other words, the radial bearing 3 is arranged between the inner-circumferential surface of the small-diameter cylindrical portion 18 of the second housing element 7 and the outer-circumferential surface of the support shaft portion 31 of the second shaft 24. In this example, a single-row deep groove ball bearing capable of bearing not only a radial load but also a thrust load is used as the radial bearing 3. The outer ring 32 of the radial bearing 3 is internally fitted on the inner-circumferential surface of the small-diameter cylindrical portion 18 without looseness, and is held in the axial direction between an outer-diameter-side flange portion 33 that protrudes inward in the radial direction of the end portion of the one side in the axial direction of the small-diameter cylindrical portion 18 and a retaining ring 34a fixed to the inner-circumferential surface of the small-diameter cylindrical portion 18. The inner ring 35 of the radial bearing 3 is externally fitted around the outer-circumferential surface of the support shaft portion 31 without looseness, and is held in the axial direction between an inner-diameter-side flange portion 36 that protrudes outward in the radial direction from the end portion on the other side in the axial direction of the support shaft portion 31 and a retaining ring 34b that is fixed on the outer-circumferential surface of the support shaft portion 31.

The radial bearing 3 has a sealing function for preventing leakage of grease sealed inside the housing 1 and preventing foreign matter from entering inside of the housing 1. More specifically, seal rings are arranged between the inner-circumferential surfaces of the end portions on both sides in the axial direction of the outer ring 32 and the outer-circumferential surfaces of the end portions on both sides in the axial direction of the inner ring 35.

The second shaft 24 includes a fitting shaft portion 37 at a portion existing further on the one side in the axial direction than the support shaft portion 31, and an engaging ridge 38 extending in the axial direction at one position in the circumferential direction of the outer-circumferential surface of the fitting shaft portion 37.

The pulley 39 includes a fitting hole 40 that penetrates in the axial direction through the central portion thereof, and an engaging concave groove 41 that extends in the axial direction at one position in the circumferential direction of the inner-circumferential surface of the fitting hole 40. By externally fitting the fitting hole 40 onto the fitting shaft portion 37, and engaging the engaging concave groove 41 with the engaging ridge 38, the pulley 39 is externally fitted with the fitting shaft portion 37 of the second shaft 24 so as to be able to transmit torque. In the illustrated example, the pulley 39 is prevented from coming off the fitting shaft portion 37 by a screw 43 that is inserted through a through hole 42 that penetrates the pulley 39 in the radial direction and screwed into a screw hole (not illustrated) that is formed in the fitting shaft portion 37 of the second shaft 24.

The reverse input cutoff clutch 25 has a function that, in a case where rotational torque is inputted to the first shaft 23, transmits the rotational torque that is inputted to the first shaft 23 to the second shaft 24, and in a case where rotational torque is reversely inputted to the second shaft 24, completely cuts off the rotational torque that is reversely inputted to the second shaft 24, and does not transmit the rotational torque to the first shaft 23, or transmits a part of the rotational torque that is reversely inputted to the second shaft 24 to the first shaft 23, and cuts off the remaining part. In this example, the reverse input cutoff clutch 25 is arranged on the inner diameter side of the large-diameter cylindrical portion 19 of the second housing element 7.

The rotor 4 is arranged (externally fitted) around an intermediate portion in the axial direction of the first shaft 23 so as to rotate integrally with the first shaft 23. Note that various conventionally known structures such as a cage type, a winding type, a permanent magnet type rotor and the like may be adopted as the rotor 4.

The stator 5 is arranged around the rotor 4 so as to be coaxial with the rotor 4, and is supported by and fixed to the housing 1. More specifically, the inner-circumferential surface of the stator 5 faces the outer-circumferential surface of the rotor 4 via a minute gap in the radial direction, and the outer-circumferential surface of the stator 5 is supported by and fixed to the inner-circumferential surface of the cylindrical portion 10 of the main body portion 8 of the first housing element 6. Various conventionally known structures such as a winding type stator, a permanent magnet type stator or the like may be adopted as the stator 5.

Next, the structure and operation of the reverse input cutoff clutch 25 will be described with reference to FIG. 3 to FIG. 11.

<Explanation of the Structure of the Reverse Input Cutoff Cutch 25>

The reverse input cutoff clutch 25 includes an input portion 26, an output portion 28, a pressed surface 45, and a pair of engaging elements 46.

Figure 5:
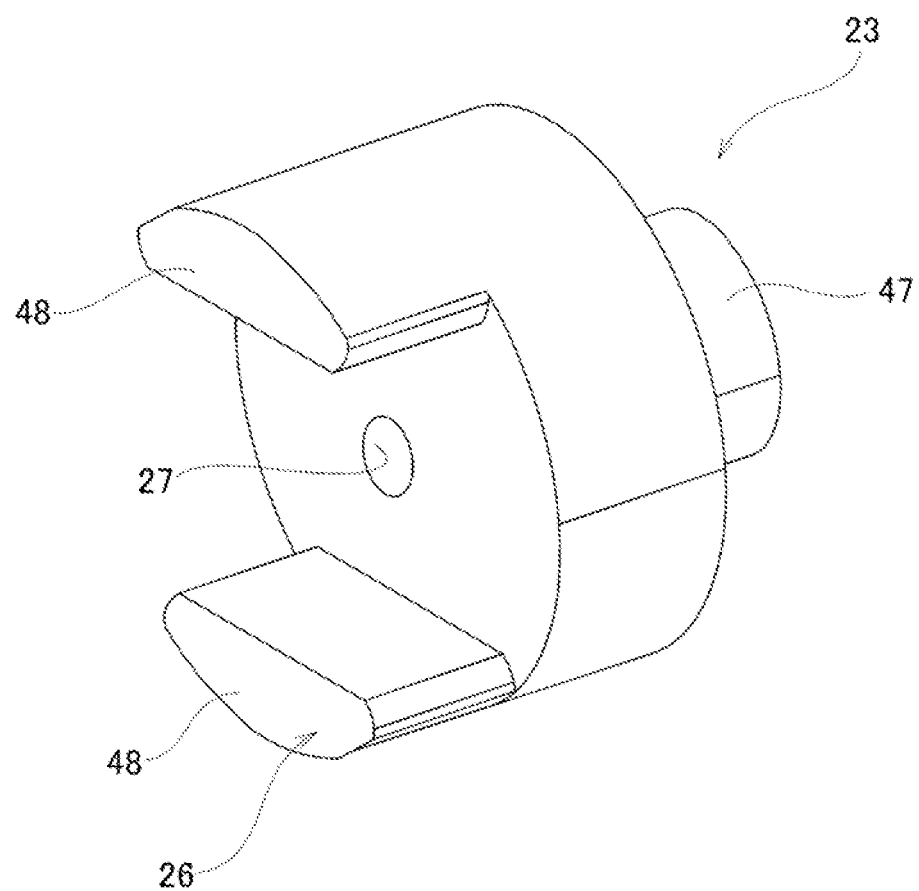
FIG. 5 is a perspective view of an input portion of the reverse input cutoff clutch of the first example.

The input portion 26 is provided at an end portion on the one side in the axial direction of the first shaft 23 (a portion existing further on the one side in the axial direction than the portion where the bearing 44a on the one side in the axial direction is externally fitted). In this example, the input portion 26, as illustrated in FIG. 5, includes an input shaft portion 47 and a pair of input-portion-side engaging portions 48.

The input shaft portion 47 has a stepped cylindrical shape, and is provided in a portion of the first shaft 23 adjacent to the one side in the axial direction of the portion where the bearing 44a on the one side in the axial direction is externally fitted. Note that the input portion 26 further includes a shaft-side concave portion 27 that is recessed in the axial direction from the central portion of the end surface on the one side in the axial direction of the input shaft portion 47. In other words, in this example, the bearing 44a on the one side in the axial direction has a function of rotatably supporting the end portion on the one side in the axial direction of the first shaft 23 with respect to the housing 1, and a function of rotatably supporting the input portion 26 of the reverse input cutoff clutch 25.

Each of the pair of input-portion-side engaging portions 48 has a bow-shaped cross-sectional shape, and protrudes in the axial direction from two positions on opposite sides in the radial direction of the end surface on the one side in the axial direction of the input shaft portion 47. The pair of input-portion-side engaging portions 48 are separated from each other in the radial direction of the input portion 26. In other words, the pair of input-portion-side engaging portions 48 are arranged in portions of the end surface on the one side in the axial direction of the input shaft portion 47 that are separated in the radial direction from the rotation center of the first shaft 23. Moreover, each of the pair of input-portion-side engaging portions 48 includes an outside surface in the radial direction having a contour shape that is the same as the contour shape of the cylindrical surface of the outer-circumferential surface of the end portion on the one side in the axial direction of the input shaft portion 47, and a flat-shaped inside surface in the radial direction.

Figure 6:
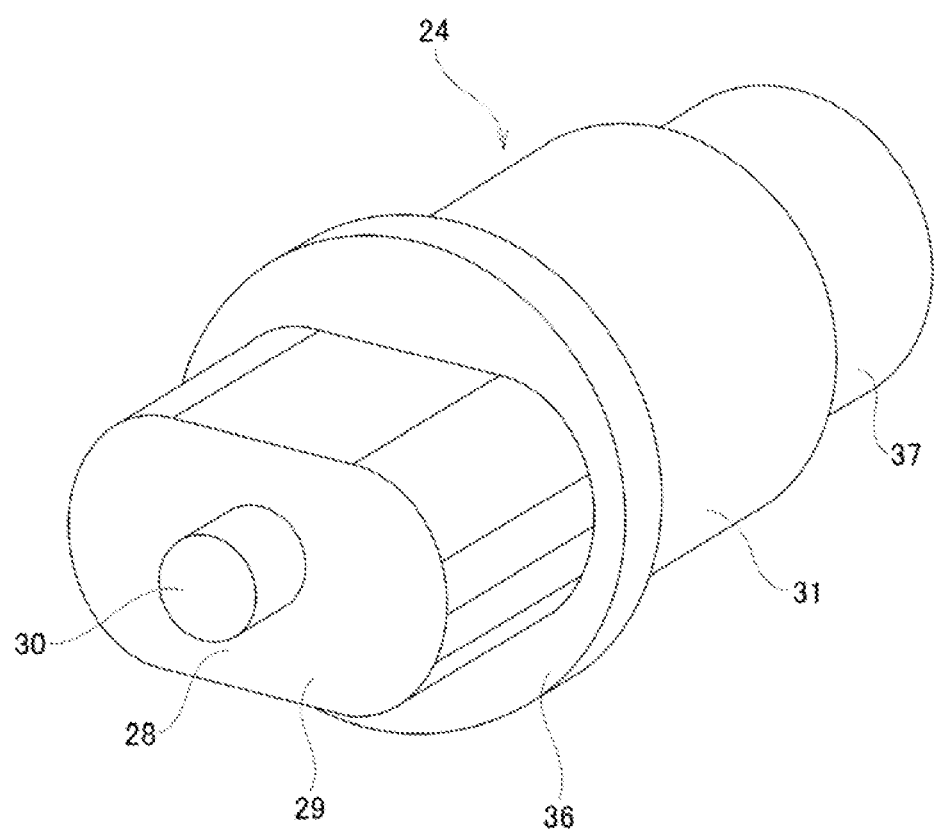
FIG. 6 is a perspective view of an output portion of the reverse input cutoff clutch of the first example.

The output portion 28 is provided at the end portion on the other side in the axial direction of the second shaft 24. The output portion 28, as illustrated in FIG. 6, includes an output-portion-side engaging portion 29. In this example, the output-portion-side engaging portion 29 protrudes in the axial direction from the end surface on the other side in the axial direction of the support shaft portion 31. The output-portion-side engaging portion 29 has a cam function. In other words, the distance from the rotation center of the second shaft 24 to the outer-circumferential surface of the output-portion-side engaging portion 29 changes in the circumferential direction. More specifically, the outer-circumferential surface of the output-portion-side engaging portion 29 is composed of a pair of flat surfaces parallel to each other and a pair of partially cylindrical convex surfaces that connect the end portions in the circumferential direction of the flat surfaces. The output-portion-side engaging portion 29 is arranged in a portion between a pair of input-portion-side engaging portions 48. Note that the output portion 28 further includes a column-shaped shaft-side convex portion 30 that protrudes in the axial direction from the central portion of the end surface on the other side in the axial direction of the output-portion-side engaging portion 29.

The pressed surface 45 is formed directly on the inner-circumferential surface of the housing 1, and is configured by a cylindrical concave surface centered on the rotation center of the output shaft 2. In this example, the pressed surface 45 is directly formed on the inner-circumferential surface of a portion on the one side in the axial direction of the large-diameter cylindrical portion 19 of the second housing element 7 (portion existing further on the one side in the axial direction than the portion that fits with the ridge 13 of the first housing element 6). However, the pressed surface 45 may also be formed by internally fitting and fixing a separate ring-shaped member inside a portion on the one side in the axial direction of the large-diameter cylindrical portion 19 of the second housing element 7 and configured by the inner-circumferential surface of that ring-shaped member. Alternatively, the pressed surface 45 may be formed by fixing a friction material to the inner-circumferential surface of a portion on the one side in the axial direction of the large-diameter cylindrical portion 19 of the second housing element 7 by adhesive, bonding, or the like, and configured by the inner-circumferential surface of that friction material, or may be formed of a coating layer and configured by the surface of that coating layer.

Each of the pair of engaging elements 46 is configured into a substantially semicircular plate shape, and is arranged on the inside in the radial direction of a portion on the one side in the axial direction of the large-diameter cylindrical portion 19 of the second housing element 7. Each of the pair of engaging elements 46 has a partial cylindrical convex pressing surface 49 on the outside surface in the radial direction, and is pressed against the pressed surface 45, and has a flat bottom surface 51 in a portion of the inside surface in the radial direction excluding the central portion in the width direction in which an engaging-element-side output engaging portion 50 described later is formed. Each of the pair of engaging elements 46 has flat surfaces 52 on both side surfaces in the width direction that are perpendicular to the bottom surface 51. Note that the radial direction of each of the engaging elements 46 means a direction perpendicular to the bottom surface 51 as indicated by the arrow A in FIG. 3, and the width direction of each of the engaging elements 46 is the direction parallel to the bottom surface 51 as indicated by the arrow B in FIG. 3. The pressing surface 49 has a radius of curvature equal to or less than the radius of curvature of the pressed surface 45. Moreover, in this example, the pressing surface 49 has a surface texture having a larger friction coefficient than the other portions of the engaging element 46. Note that the pressing surface 49 may be configured directly by the surface of the engaging element 46, or may be configured by a friction material fixed to the engaging element 46 by adhesive, bonding, or the like.

Each of the pair of engaging elements 46 further includes an engaging-element-side input engaging portion 53 and an engaging-element-side output engaging portion 50.

In this example, the engaging-element-side input engaging portion 53 includes an input engaging hole that is a through hole that penetrates in the axial direction through an intermediate portion in the radial direction of the engaging element 46, and has a substantially semicircular opening shape. The engaging-element-side input engaging portion 53 has a size that allows the input-portion-side engaging portion 48 to be loosely inserted. More specifically, in a state in which the input-portion-side engaging portion 48 is inserted inside the engaging-element-side input engaging portion 53, there is a gap in the width direction of the engaging element 46 and a gap in the radial direction of the engaging element 46 between the input-portion-side engaging portion 48 and the inner surface of the engaging-element-side input engaging portion 53. Therefore, the input-portion-side engaging portion 48 is able to displace in the rotation direction of the input portion 26 (first shaft 23) with respect to the engaging-element-side input engaging portion 53 (engaging element 46), and the engaging-element-side input engaging portion 53 is able to displace in the radial direction of the engaging element 46 with respect to the input-portion-side engaging portion 48.

In this example, the engaging-element-side output engaging portion 50 is configured by a substantially rectangular concave portion that is recessed from the central portion in the width direction of the bottom surface 51 of each of the engaging elements 46 toward the outside in the radial direction. The engaging-element-side output engaging portion 50 has a size and a shape that allows the front half portion in the minor axis direction of the output-portion-side engaging portion 29 to be arranged inside the engaging-element-side output engaging portion 50 without looseness. More specifically, the engaging-element-side output engaging portion 50 has an opening width that is substantially the same (same or slightly larger) as the dimension in the major axis direction of the output-portion-side engaging portion 29, and has a radial depth slightly smaller than ½ of the dimension in the minor axis direction of the output-portion-side engaging portion 29. The engaging-element-side output engaging portion 50 has a bottom portion that is a flat surface parallel to the bottom surface 51. However, the entire inside surface in the radial direction of the engaging element may be a flat surface-like bottom surface, and the engaging-element-side output engaging portion that engages with the output-member-side engaging portion of the output member may be configured by the central portion in the width direction of the bottom surface.

The reverse input cutoff clutch 25 of this example is such that, in the assembled state, a pair of input-portion-side engaging portions 48 of the input portion 26 arranged on the other side in the axial direction are inserted in the axial direction through the engaging-element-side input engaging portions 53 of the pair of engaging elements 46, and the output-portion-side engaging portion 29 of the output portion 28 arranged on the one side in the axial direction is inserted in the axial direction between the pair of engaging-element-side output engaging portions 50. In other words, the pair of engaging elements 46 are arranged so as to sandwich the output-portion-side engaging portion 29 from the outside in the radial direction by the respective engaging-element-side output engaging portions 50. In this example, the dimension in the axial direction of the input-portion-side engaging portions 48, the dimension in the axial direction of the output-portion-side engaging portion 29, the dimension in the axial direction of the pressed surface 45, and the dimension in the axial direction of the engaging elements 46 are mostly the same.

<Explanation of the Operation of the Reverse Input Cutoff Clutch 25>

Next, the operation of the reverse input cutoff clutch 25 will be described.

(When rotational torque is inputted to the input portion 26 (first shaft 23))

Figure 7:
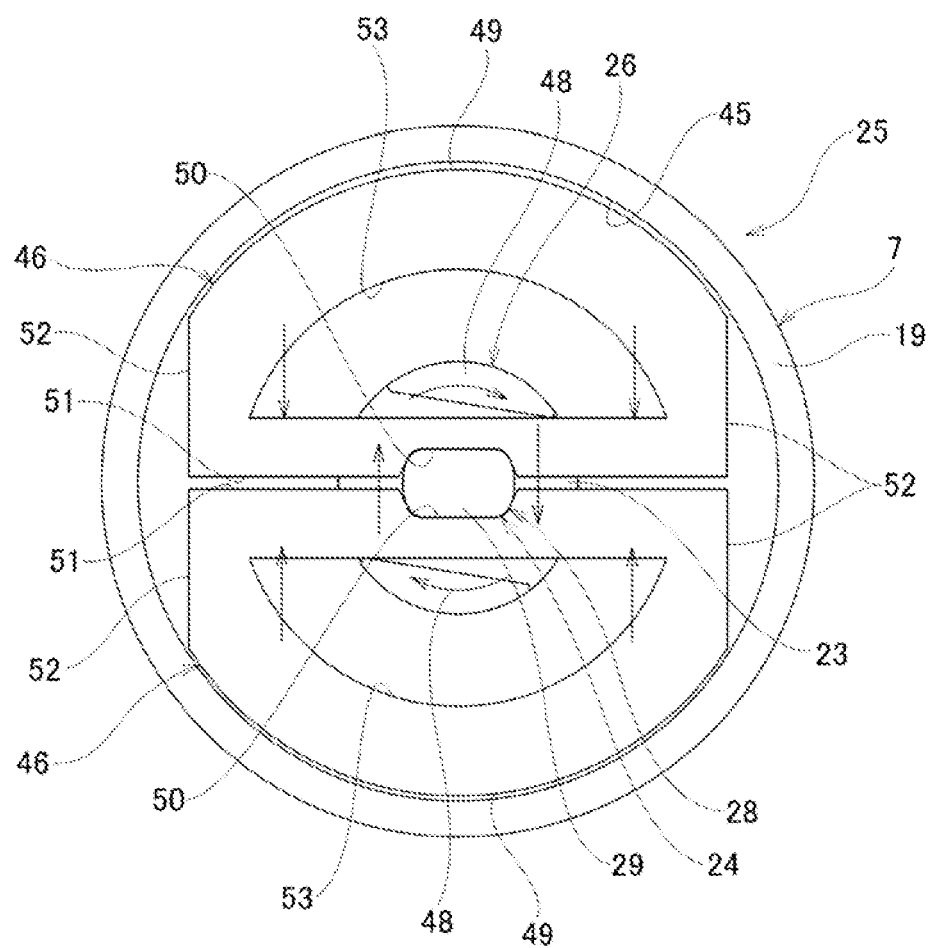
FIG. 7 is a cross-sectional view of the reverse input cutoff clutch of the first example in which a rotational torque is inputted to the input portion.

First, a case where a rotational torque is inputted to the input portion 26 (first shaft 23) will be described. In the electric motor of this example, by energizing the stator 5 and applying a force in the rotational direction to the rotor 4 inside the stator 5, rotational torque is inputted to the first shaft 23 of the output shaft 2. As illustrated in FIG. 7, when rotational torque is inputted to the first shaft 23, the input-portion-side engaging portions 48 of the input portion 26 rotate in the rotation direction of the first shaft 23 (clockwise in the example of FIG. 7) inside the engaging-element-side input engaging portions 53. As a result, the inside surfaces in the radial direction of the input-portion-side engaging portions 48 press the inside surfaces of the engaging-element-side input engaging portions 53 toward the inside in the radial direction, which causes the pair of engaging elements 46 to move in directions away from the pressed surface 45. In other words, the pair of engaging elements 46 are moved toward the inside in the radial direction, or in other words, directions approaching each other, due to the engagement with the input portion 26 (the engaging element 46 located on the upper side in FIG. 7 is moved downward, and the engaging element 46 located on the lower side in FIG. 7 is moved upward). As a result, the bottom surfaces 51 of the pair of engaging elements 46 move in directions approaching each other, and the pair of engaging-element-side output engaging portions 50 hold the output-portion-side engaging portion 29 of the output portion 28 from both sides in the radial direction. In other words, while rotating the output portion 28 so that the major axis direction of the output-portion-side engaging portion 29 becomes parallel to the bottom surfaces 51 of the engaging elements 46, the output-portion-side engaging portion 29 and the pair of engaging-element-side output engaging portions 50 are engaged without looseness. Therefore, the rotational torque inputted to the input portion 26 of the first shaft 23 is transmitted to the output portion 28 of the second shaft 24 via the pair of engaging elements 46, and is outputted from the pulley 39 that is externally fitted on the fitting shaft portion 37 of the second shaft 24.

In the reverse input cutoff clutch 25 of this example, when rotational torque is inputted to the first shaft 23, the pair of engaging elements 46 are moved in directions away from the pressed surface 45 from the pressed surface 45 regardless of the rotational direction of the first shaft 23. Then, regardless of the rotation direction of the first shaft 23, the rotational torque inputted to the first shaft 23 is transmitted to the second shaft 24 via the pair of engaging elements 46.

(When rotational torque is reversely inputted to the output portion 28 (second shaft 24))

Figure 8:
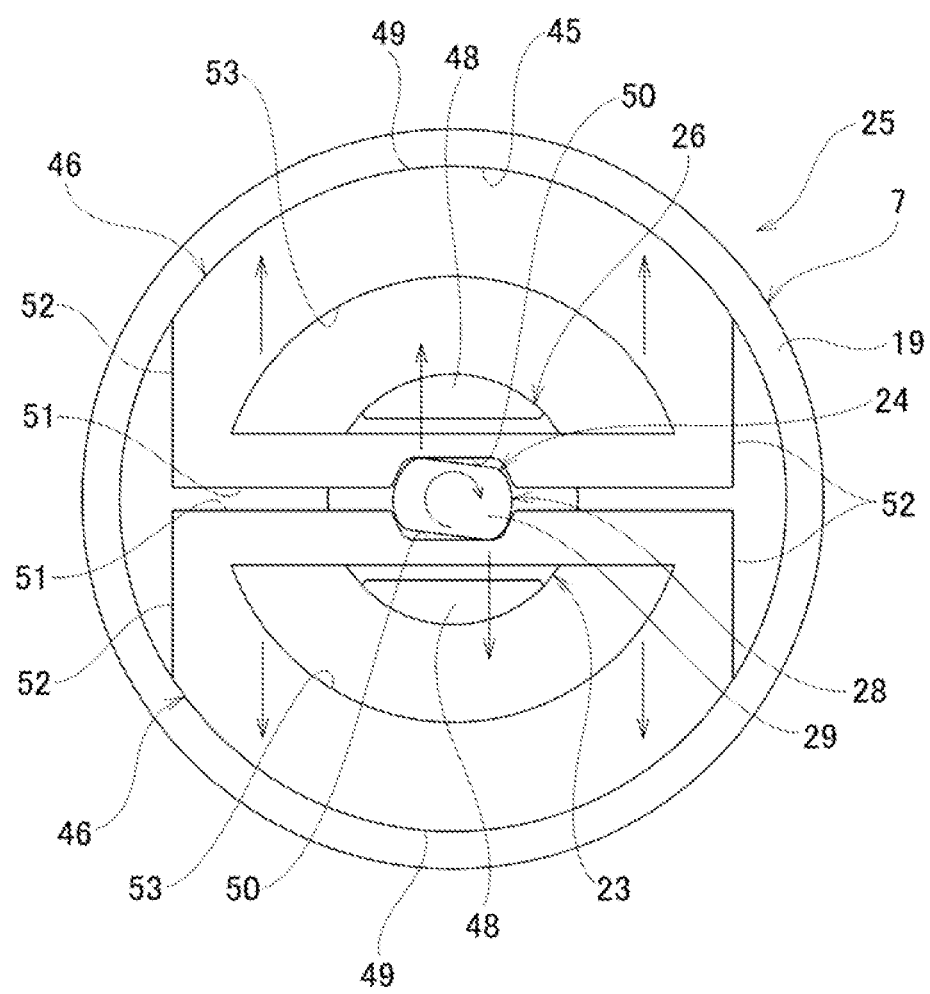
FIG. 8 is a cross-sectional view of the reverse input cutoff clutch of the first example in which a rotational torque is reversely inputted to the output portion.

Next, a case where rotational torque is reversely inputted to the output portion 28 (second shaft 24) will be described. When an external force acts on a displacement member connected to a pulley 39 via a belt or the like so as to be able to transmit torque, the rotational torque is reversely inputted to the second shaft 24 via the pulley 39. As illustrated in FIG. 8, when rotational torque is reversely inputted to the second shaft 24, the output-portion-side engaging portion 29 of the output portion 28 rotates in the rotation direction (clockwise direction in the example in FIG. 8) of the second shaft 24 inside the pair of engaging-element-side output engaging portions 50. As a result, the corner portions of the output-portion-side engaging portion 29 press the bottom portions of the engaging-element-side output engaging portions 50 toward the outside in the radial direction, which causes the pair of engaging elements 46 to move in directions approaching the pressed surface 45. In other words, the pair of engaging elements 46 are moved toward the outside in the radial direction, or in other words, directions away from each other, due to the engagement with the output portion 28

(the engaging element 46 located on the upper side in FIG. 8 is moved upward, and the engaging element 46 located on the lower side in FIG. 8 is moved downward). This causes the pressing surface 49 of each of the pair of engaging elements 46 to be pressed against the pressed surface 45. At this time, the pressing surfaces 49 and the pressed surface 45 come into contact with each other over the entire range or a part of the range (for example, the central portion) in the circumferential direction of the pressing surfaces 49. As a result, by the rotational torque reversely inputted to the second shaft 24 being transmitted to the housing 1 fixed to another member (not illustrated), the rotational torque is completely cut off and is not transmitted to the first shaft 23, or only a part of the rotational torque reversely inputted to the second shaft 24 is transmitted to the first shaft 23, and the remaining part is cut off.

In order to completely cut off the rotational torque reversely inputted to the second shaft 24 and prevent that torque from being transmitted to the first shaft 23, the output portion 28 is locked by the pair of engaging elements 46 being engaged between the output-portion-side engaging portion 29 and the large-diameter cylindrical portion 19 of the second housing element 7 so that the pressing surfaces 49 do not slide (relatively rotate) with respect to the pressed surface 45. On the other hand, in order that only a part of the rotational torque that is reversely inputted to the second shaft 24 is transmitted to the first shaft 23 and the remaining part is cut off, the output portion 28 is half-locked by the pair of engaging elements 46 being engaged between the output-portion-side engaging portion 29 and the large-diameter cylindrical portion 19 of the second housing element 7 so that the pressing surfaces 49 slide with respect to the pressed surface 45.

When further rotational torque is reversely inputted to the second shaft 24 with the output portion 28 in the half-locked state, the pair of engaging elements 46 rotate about the rotation center of the output shaft 2 while the pressing surfaces 49 are caused to slide with respect to the pressed surface 45 due to the engagement between the output-portion-side engaging portion 29 and the engaging-element-side output engaging portions 50. When the pair of engaging elements 46 rotate, the inside surfaces of the engaging-element-side input engaging portions 53 press the inside surfaces in the radial direction of the input-portion-side engaging portions 48 in the circumferential direction (rotation direction), and part of the rotational torque is transmitted to the first shaft 23.

In the reverse input cutoff clutch 25 of this example, the size of the gaps between the input portion 26, the output portion 28, the pressed surface 45, and the pair of engaging elements 46 are adjusted so that the above operation is possible.

Figure 11:
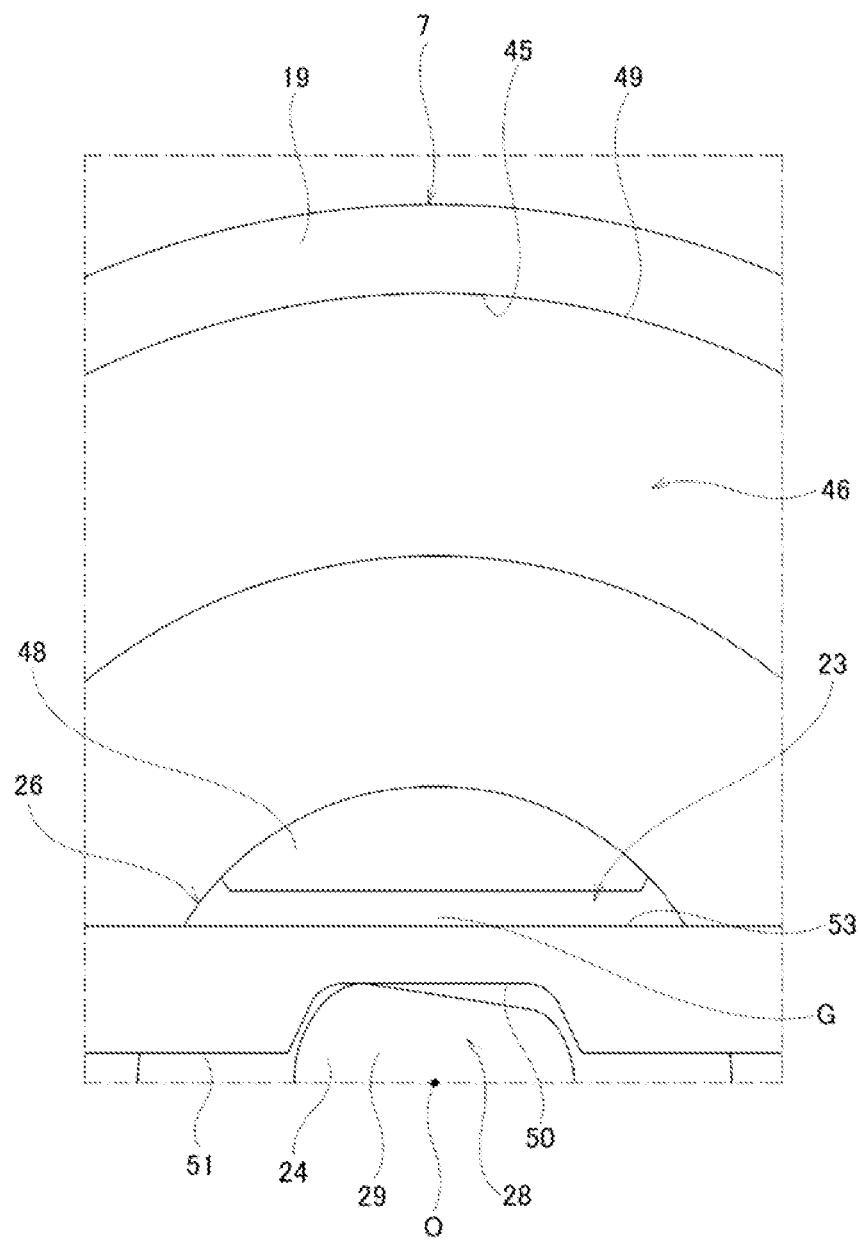
FIG. 11 is a partially enlarged view illustrating a state of the reverse input cutoff clutch of the first example when the rotational torque is reversely inputted to the output member and the pressing surface of the engaging element comes into contact with a pressed surface, and an input engagement convex portion is located at the central portion in the width direction of the engaging element.

In this example, as illustrated in FIG. 11, in the positional relation in which the pressing surface 49 of each of the engaging element 46 comes into contact with the pressed surface 45 due to rotational torque being reversely inputted to the output portion 28 (second shaft 24), when the input-portion-side engaging portion 48 is positioned in the center in the width direction of the engaging-element-side input engaging portion 53, or in other words, when the central portion in the circumferential direction, which is a portion of the inside surface in the radial direction of the input-portion-side engaging portion 48 that is located at the closest position from the rotation center O of the input portion 26 (first shaft 23) (=the rotation center of the output portion 28 (second shaft 24)) is at the farthest on the outside (upper side in FIG. 11) in the radial direction from the rotation center O of the input portion 26 in the near-far direction (up-down direction in FIG. 11) of the pressing surface 49 with respect to the pressed surface 45, the inside surface in the radial direction of the input-portion-side engaging portion 48 and the inner surface of the engaging-element-side input engaging portion 53 do not come in contact. In other words, there is a gap G between the inside surface in the radial direction of the input-portion-side engaging portion 48 and the inner surface of the engaging-element-side input engaging portion 53 that allows the pressing surface 49 to be pressed toward the pressed surface 45 due to the corners of the output-portion-side engaging portion 29 pressing the bottom surface of the engaging-element-side output engaging portion 50. As a result, in a case where rotational torque is reversely inputted to the output portion 28, the engaging elements 46 are not prevented from moving toward the outside in the radial direction (upper side in FIG. 11) by the input-portion-side engaging portions 48, and even after the pressing surfaces 49 come in contact with the pressed surface 45, by the pressure acting on the contact portions between the pressing surfaces 49 and the pressed surface 45 changing according to the size of the rotational torque that is reversely inputted to the output portion 28, the output portion 28 is appropriately locked or half-locked.

The principle and conditions for locking or half-locking the output portion 28 when the rotational torque is reversely inputted to the output portion 28 (second shaft 24) as described above will be described in more detail with reference to FIG. 9 and FIG. 10.

Figure 9:
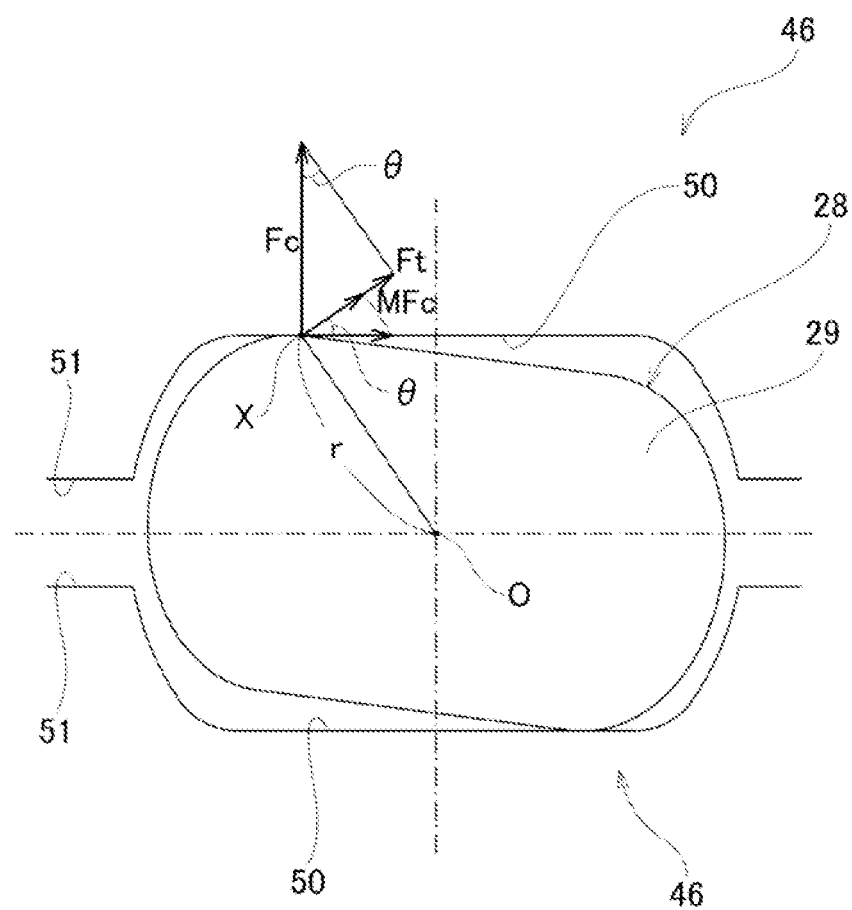
FIG. 9 is a partially enlarged view of FIG. 8 illustrating the relation between the forces acting on an engaging element from the output portion when the rotational torque is reversely inputted to the output portion in the reverse input cutoff clutch of the first example.

By rotational torque being reversely inputted to the output portion 28, each of the corners of the output-portion-side engaging portion 29 comes in contact with the bottom portion of each of the engaging-element-side output engaging portions 50, and as illustrated in FIG. 9, a normal force Fc in the direction perpendicular to the bottom portion of the engaging-element-side output engaging portion 50 acts on the contact portion X between the corner of the output-portion-side engaging portion 29 and the bottom portion of the engaging-element-side output engaging portion 50. Moreover, presuming that the friction coefficient between the output-portion-side engaging portion 29 and the engaging-element-side output engaging portion 50 is μ, a friction force μFc acts on the contact portion in direction parallel to the bottom portion of the engaging-element-side output engaging portion 50. Here, presuming that the wedge angle between the direction of the line of action of a tangential force Ft acting on the contact portion X and the bottom portion of the engaging-element-side output engaging portion 50 is θ, the tangential force Ft is calculated by the following Equation (1).

$$Ft = Fc \cdot \sin\theta + \mu Fc \cdot \cos\theta \quad (1)$$

Therefore, the normal force Fc is expressed by the following Equation (2) using the tangential force Ft.

$$Fc = Ft/(\sin\theta + \mu \cdot \cos\theta) \quad (2)$$

When the corner of the output-portion-side engaging portion 29 comes in contact with the bottom portion of the engaging-element-side output engaging portion 50, the size of the torque that is transmitted from the output portion 28 to the engaging element 46 is expressed by the following Equation (3), where r is taken to be the distance from the rotation center O of the output portion 28 (second shaft 24) to the contact portion X.

$$T = r \cdot Ft \quad (3)$$

Figure 10:
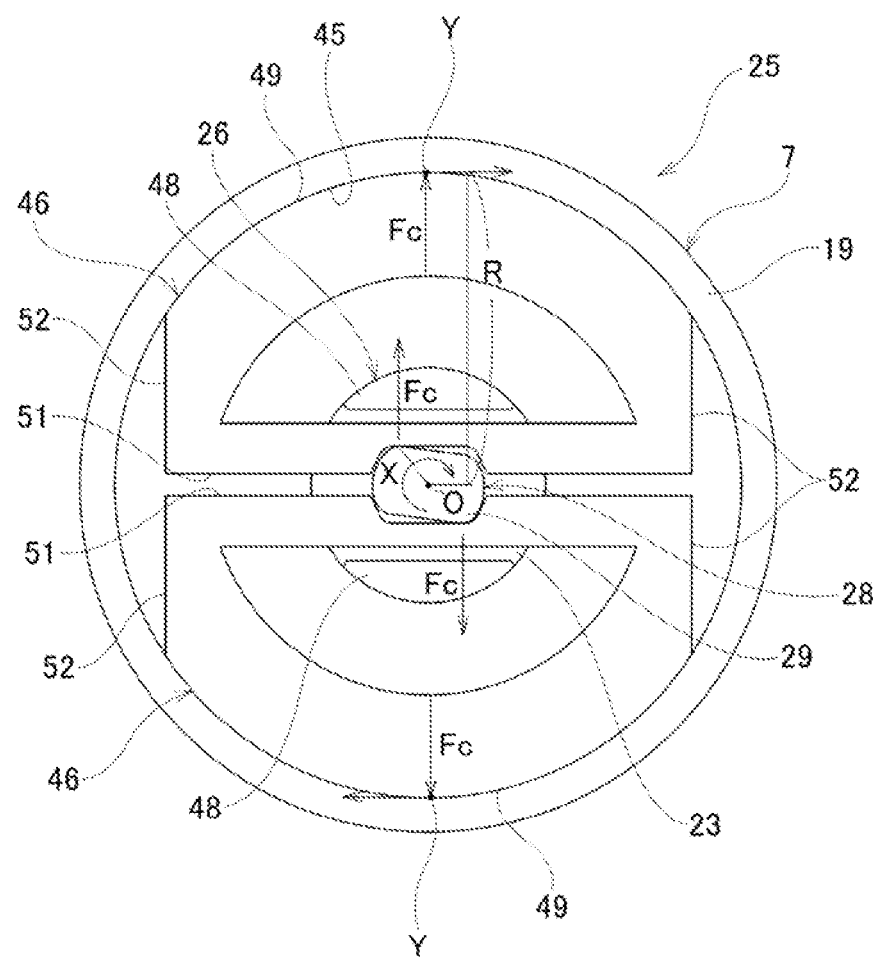
FIG. 10 is a cross-sectional view of the reverse input cutoff clutch of the first example for explaining a condition in which the output portion is locked or half-locked when the rotational torque is reversely inputted to the output portion.

As described above, the normal force Fc acts on the contact portion X, so as illustrated in FIG. 10, the pressing surface 49 of the engaging element 46 is pressed against the pressed surface 45 by the normal force Fc. Therefore, the size of the braking torque T' acting on the engaging element 46 is expressed by the following Equation (4), where the friction coefficient between the pressing surface 49 and the pressed surface 45 is taken to be μ', and the distance from the rotation center ○ of the output portion 28 to the contact portion Y between the pressing surface 49 and the pressed surface 45 is taken to be R.

$$T'=\mu'RFc \tag{4}$$

Therefore, it can be seen that in order to obtain a larger braking force, the friction coefficient ρ', the distance R, and the normal force Fc should be increased.

Moreover, in order to lock the output portion 28 (second shaft 24) so that rotational torque that is reversely inputted to the output portion 28 is not transmitted to the input portion 26 (first shaft 23), it is necessary that transmission torque T and the braking torque T' satisfy the relation of the following Equation (5).

$$T<T' \tag{5}$$

Furthermore, by substituting the above Equations (1) to (4) into the above Equation (5), the following Equation (6) may be obtained.

$$\mu'R/(\sin\theta+\mu\cdot\cos\theta)>r \tag{6}$$

Based on the Equation (6) above, it can be seen that when the friction coefficient μ' between the pressing surface 49 and the pressed surface 45 is increased, the output portion 28 may be locked even though the distance R is decreased.

Moreover, presuming that the friction coefficient μ and the friction coefficient μ' are both 0.1, the following Equation (7) is obtained from the Equation (6) above.

$$R>10r(\sin\theta+0.1\cos\theta) \tag{7}$$

From the Equation (7) above, it can be seen that by properly setting the distance r from the rotation center ○ of the output portion 28 to the contact portion X, the distance R from the rotation center ○ of the output portion 28 to the contact portion Y, and the wedge angle θ between the direction of the action line of the tangential force Ft and the bottom surface of the engaging-element-side output engaging portion 50, the output portion 28 can be locked.

On the other hand, in order to half-lock the output portion 28 (second shaft 24) so only a part of the rotational torque that is reversely inputted to the output portion 28 is transmitted to the input portion 26 (first shaft 23) and the remaining part is cut off, it is necessary that transmission torque T and the braking torque T' satisfy the relation of the following Equation (8).

$$T>T' \tag{8}$$

In addition, as is clear from Equation (6) above, by properly setting the friction coefficient μ between the output-portion-side engaging portion 29 and the engaging-element-side output engaging portion 50, the friction coefficient μ between the pressing surface 49 and the pressed surface 45, the distance r from the rotation center ○ of the output portion 28 to the contact portion X, the distance R from the rotation center ○ of the output portion 28 to the contact portion Y, and the wedge angle θ between the direction of the action line of the tangential force Ft and the bottom surface of the engaging-element-side output engaging portion 50, it is possible to half-lock the output portion 28.

Furthermore, in a case where rotational torque is inputted to the input portion 26 in a locked state or half-locked state of the output portion 28, the locked state or half-locked state of the output portion 28 is released as the normal force acting on the engaging elements 46 from the input portion 26 becomes larger than the normal force Fc acting on the engaging elements 46 from the output portion 28. In other words, the engaging elements 46 move inward in the radial direction and the rotational torque is transmitted from the input portion 26 to the output portion 28.

In the electric motor with a reverse input cutoff clutch of this example, the output shaft 2 is configured by connecting the first shaft 23 and the second shaft 24, which are arranged coaxially with each other, via the reverse input cutoff clutch 25. Therefore, even when the stator 5 is not energized, the position in the rotational direction of the pulley 39 that is externally fitted with and supported by the second shaft 24 (and thus the position of the displacement member connected to the pulley 39 via the belt) is maintained, or, alternatively, the resistance to rotating the pulley 39 may be increased.

In the electric motor with a reverse input cutoff clutch of this example, the output shaft 2 is configured by connecting the first shaft 23 and the second shaft 24, which are arranged coaxially with each other, via the reverse input cutoff clutch 25. Therefore, in comparison with a structure in which the input member and output member of the reverse input cutoff clutch are arranged in parallel with the output shaft of the electric motor as in the case of the electric motor actuator described in JP 2007-16878A, it is possible to easily downsize the electric motor with a reverse input cutoff clutch of this example.

Figure 12:
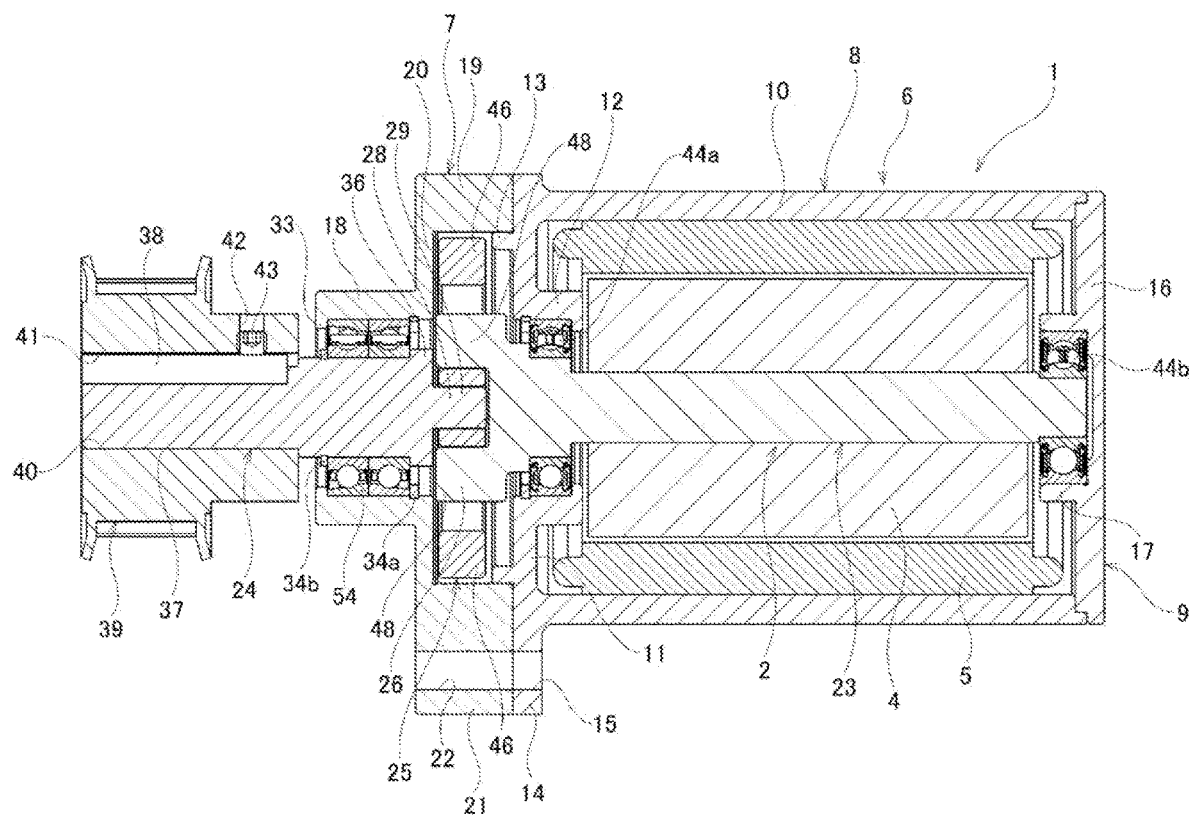
FIG. 12 is a cross-sectional view illustrating an electric motor with a reverse input cutoff clutch of a comparative example.

Particularly, in this example, the second shaft 24 is rotatably supported by the housing 1 by one radial bearing 3, which is a single-row deep groove ball bearing capable of bearing a thrust load in addition to a radial load, and thus it is possible to further reduce the size of the electric motor with a reverse input cutoff clutch. This aspect will be described with reference to FIG. 1 that illustrates the structure of the present example, as well as FIG. 12 that illustrates the structure of a comparative example.

There is a possibility that not only a radial load but also a thrust load may be applied to the second shaft 24 that supports the pulley 39, and thus it is necessary that the second shaft 24 be rotatably supported with respect to the housing 1 by a rolling bearing capable of bearing a radial load and a thrust load. Therefore, as in the comparative example illustrated in FIG. 12, when the second shaft 24 is rotatably supported with respect to the housing 1 by the double-row angular contact ball bearing 54 provided with a rear combination type contact angle, the support rigidity against a radial load and a thrust load may be increased. However, in a case where a double-row angular contact ball bearing 54 is used, the dimension in the axial direction of the portion that rotatably supports the second shaft 24 becomes large, which is disadvantageous from the aspect of downsizing the electric motor with a reverse input cutoff clutch. Moreover, in the case of a double-row angular contact ball bearing 54, adjusting the preload in the axial direction is troublesome, and may increase the assembly cost. Furthermore, in order to prevent leakage of grease sealed inside the housing 1 and prevent foreign matter from entering inside the housing 1, it is necessary to use a double-row angular contact ball bearing 54 having a sealing function. However, since a double-row angular contact ball bearing 54 having a sealing function is expensive, the manufacturing cost of an electric motor with a reverse input cutoff clutch may increase.

On the other hand, in this example, the second shaft 24 is rotatably supported by the housing 1 by one radial bearing 3, which is a single row deep groove ball bearing. Therefore, in comparing the electric motor with a reverse input cutoff clutch of this example with the structure of the comparison example in FIG. 12, the dimension in the axial direction of the portion rotatably supporting the second shaft 24 may be kept small, so it is possible to further reduce the size. Moreover, for the radial bearing 3, which is a single-row deep groove ball bearing, it is not necessary to adjust the preload in the axial direction as in a case of the double-row angular contact ball bearing 54 of the comparative example, and furthermore, a single-row deep groove ball bearing having a sealing function is less expensive than the double-row angular contact ball bearings 54 having a sealing function. Therefore, in comparing the electric motor with a reverse input cutoff clutch of this example with the structure of the comparative example, it is possible to reduce assembly cost and manufacturing cost.

Furthermore, in this example, the bearing 44a on the one side in the axial direction has a function of rotatably supporting the end portion on the one side in the axial direction of the first shaft 23 with respect to the housing 1, and also has a function of rotatably supporting the input portion 26 of the reverse input cutoff clutch 25. As a result, it is possible to shorten the dimension in the axial direction of the output shaft 2 that is configured by connecting the first shaft 23 and the second shaft 24 by the reverse input cutoff clutch 25, and therefore, from this aspect as well, it is possible to downsize the electric motor with a reverse input cutoff clutch.

In this example, there is an in-row fit between the shaft-side concave portion 27 that is formed on the end surface on the one side in the axial direction of the first shaft 23 and the shaft-side convex portion 30 that is formed on the end portion on the other side in the axial direction of the second shaft 24. Therefore, even when the second shaft 24 is rotatably supported with respect to the housing 1 by the radial bearing 3, it is possible to prevent the second shaft 24 from becoming loose, or in other words, it is possible to prevent the swing of the second shaft 24 about the support shaft portion 31 from becoming excessively large.

Moreover, with the reverse input cutoff clutch 25 of this example, it is possible to shorten the dimension in the axial direction and reduce the number of parts.

The reverse input cutoff clutch 25 converts the rotation of both the input portion 26 and the output portion 28 to movement in the radial direction of the engaging elements 46. Then, by converting the rotation of the input portion 26 and the output portion 28 into movement in the radial direction of the engaging elements 46 in this way, the engaging elements 46 are made to engage with the output portion 28 that is located on the inner side in the radial direction of the engaging elements 46, or the engaging elements 46 are pressed against the pressed surface 45 located on the outer side in the radial direction of the engaging elements 46. In this way, the reverse input cutoff clutch 25 of this example is able to switch between a released state in which the locked or half-locked output portion 28 is released and it is possible to transmit rotational torque from the input portion 26 to the output portion 28 due to the movement in the radial direction of the engaging elements 46 that are controlled by the rotation of the input portion 26 and the output portion 28, and a locked or half-locked state of the output portion 28 in which rotation of the output portion 28 is prevented or suppressed, and therefore, it is possible to shorten the dimension in the axial direction of the reverse input cutoff clutch 25. From this aspect as well, it is possible to easily downsize the electric motor with reverse input cutoff clutch.

Moreover, the engaging elements 46 are provided with both a function of transmitting the rotational torque inputted to the input portion 26 to the output portion 28, and a function of locking or half-locking the output portion 28. Therefore, the number of parts of the reverse input cutoff clutch 25 may be suppressed, and the operation may be made more stable as compared with a case where separate members have a function of transmitting rotational torque and a function of locking or half-locking. For example, in a case where separate members have a function of transmitting rotational torque and a function of locking or half-locking, there is a possibility that there will be a deviation in the timing for releasing a locked or half-locked state and the timing for starting the transmission of rotational torque. In this case, when rotational torque is reversely inputted to the output member during the time from when the locked or half-locked state is released and until the start of transmission of the rotational torque, the output member becomes locked or half-locked again. In this example, the engaging elements 46 are provided with both a function of transmitting rotational torque to the output portion 28 and a function of locking or half-locking the output portion 28, and thus the occurrence of such an inconvenience may be prevented.

Moreover, the directions of the forces acting on the engaging elements 46 from the input portion 26 and the directions of the forces acting on the engaging elements 46 from the output portion 28 are opposite to each other, and therefore, by regulating the relation of the size between both forces, it is possible to control the direction of movement of the engaging elements 46. Accordingly, the operation of switching between the locked or half-locked state and the lock or half-lock released state of the output portion 28 may be stably and surely performed. Therefore, it is possible to prevent the occurrence of problems such as those that occur in the reverse input cutoff clutches described in JP 2007-232095A and JP 2004-084918A in which the rolling bodies bite into and remain in narrow-width portions in the radial direction of wedge-shaped spaces such that the locked state may not be released.

Figure 13A:
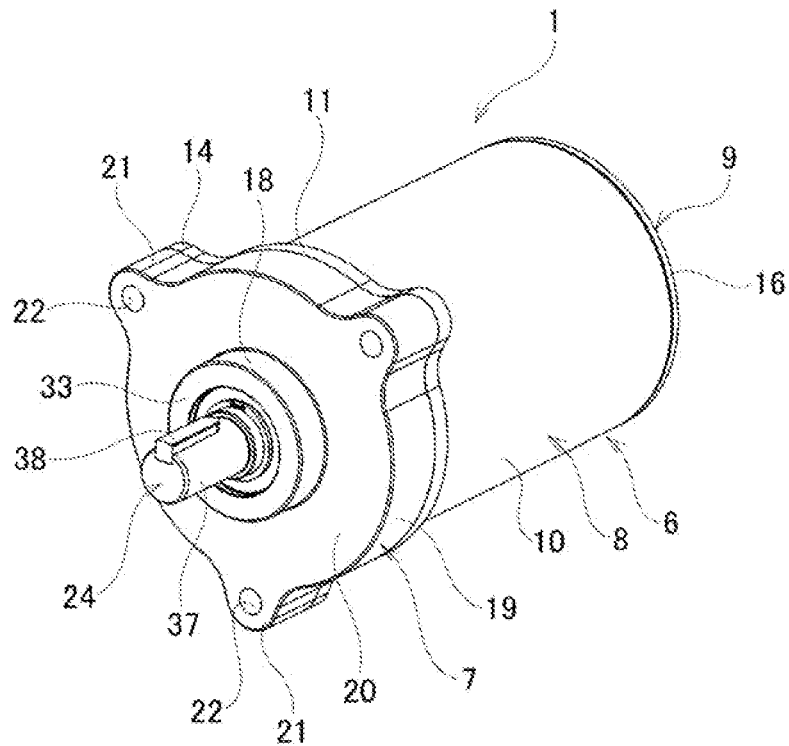
FIG. 13A and FIG. 13B are perspective views for explaining two examples of a fitting shaft portion of a second shaft applicable to the electric motor with a reverse input cutoff clutch of the first example.
Figure 13B:
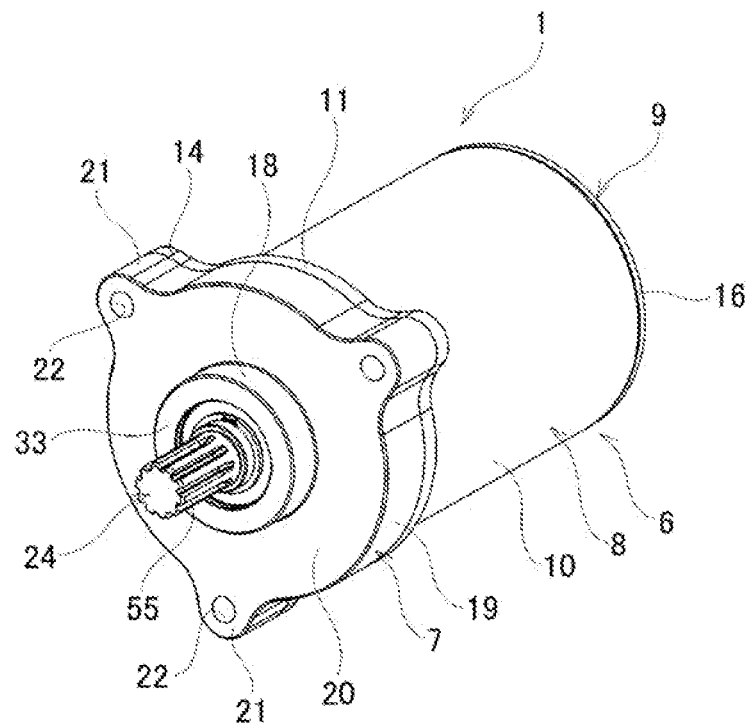

In this example, as illustrated in FIG. 13A, an engaging ridge 38 that extends in the axial direction is formed on the fitting shaft portion 37 of the second shaft 24, and by the engaging ridge 38 engaging with the engaging concave groove 41 of the pulley 39, the pulley 39 and the second shaft 24 are coupled so as to be able to transmit torque. However, other structures may also be adopted as long as the pulley 39 and the second shaft 24 may be coupled so as to be able to transmit torque. For example, as illustrated in FIG. 13B, a male spline portion 55 may be formed on the outer-circumferential surface of the fitting shaft portion 37, and the male spline portion 55 may be engaged with a female spline portion formed on the inner-circumferential surface of the pulley 39.

Figure 14A:
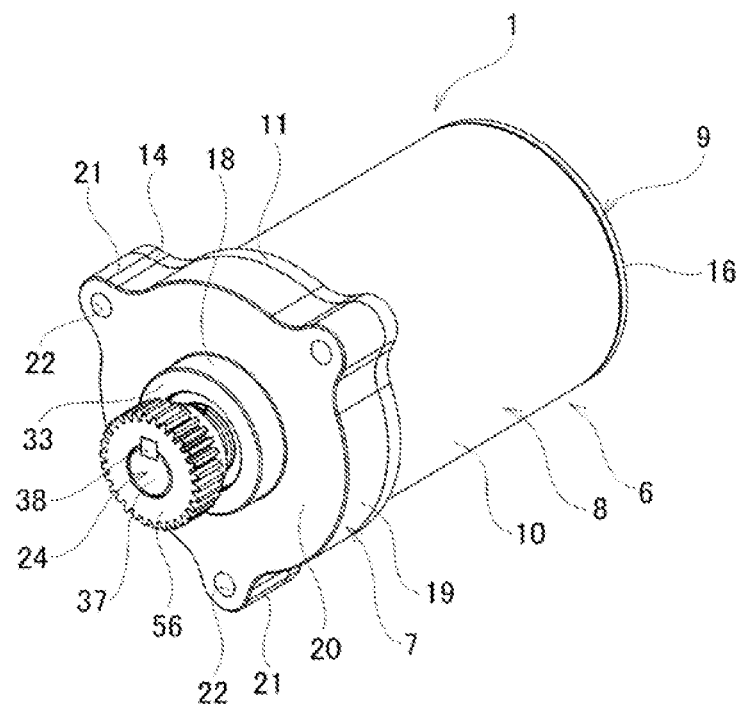
FIG. 14A and FIG. 14B are perspective views illustrating two examples of a driven unit applicable to the electric motor with a reverse input cutoff clutch of the first example.
Figure 14B:
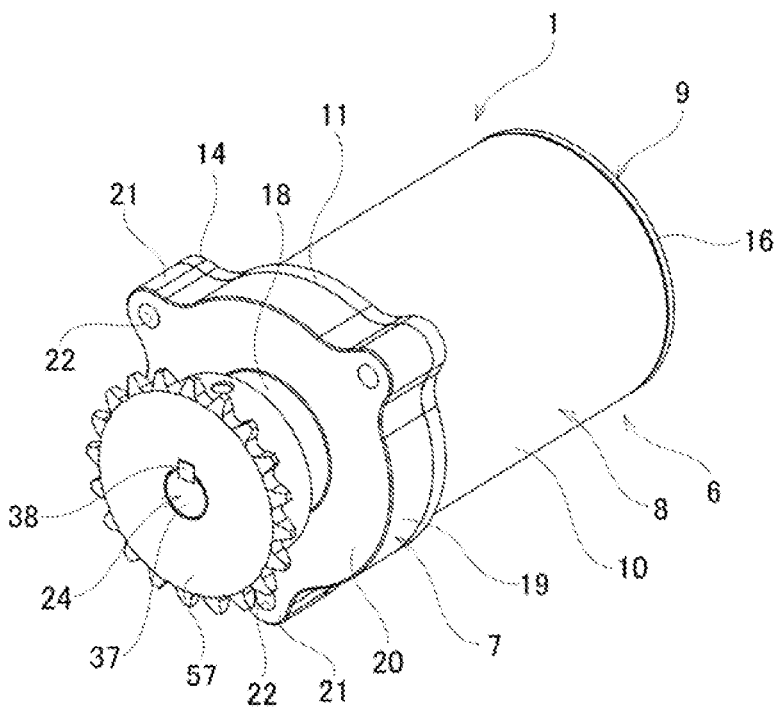

In this example, the pulley 39 around which an endless belt is placed is externally fitted on and supported by the fitting shaft portion 37 of the second shaft 24; however, the member that is externally fitted on and supported by the fitting shaft portion 37 is not limited to this, and, for example, a gear 56 such as illustrated in FIG. 14A or a sprocket 57 such as illustrated in FIG. 14B or the like may be used.

In this example, a housing positioning means for positioning the first housing element 6 and the second housing element 7 in the radial direction is configured by an uneven fitting portion between the outer-circumferential surface of a ridge 13 of the first housing element 6 and an inner-circumferential surface of the end portion on the other side in the axial direction of the large-diameter cylindrical portion 19 of the second housing element 7. However, the housing positioning means is not limited to this, and, for example, may also have a structure in which pin portions provided at a plurality of locations in the circumferential direction of one housing element of the first housing element 6 and the second housing element 7 are inserted into convex holes provided at a plurality of locations in the circumferential direction of the other housing element such that there is no looseness in the radial direction.

Second Example

Figure 15:
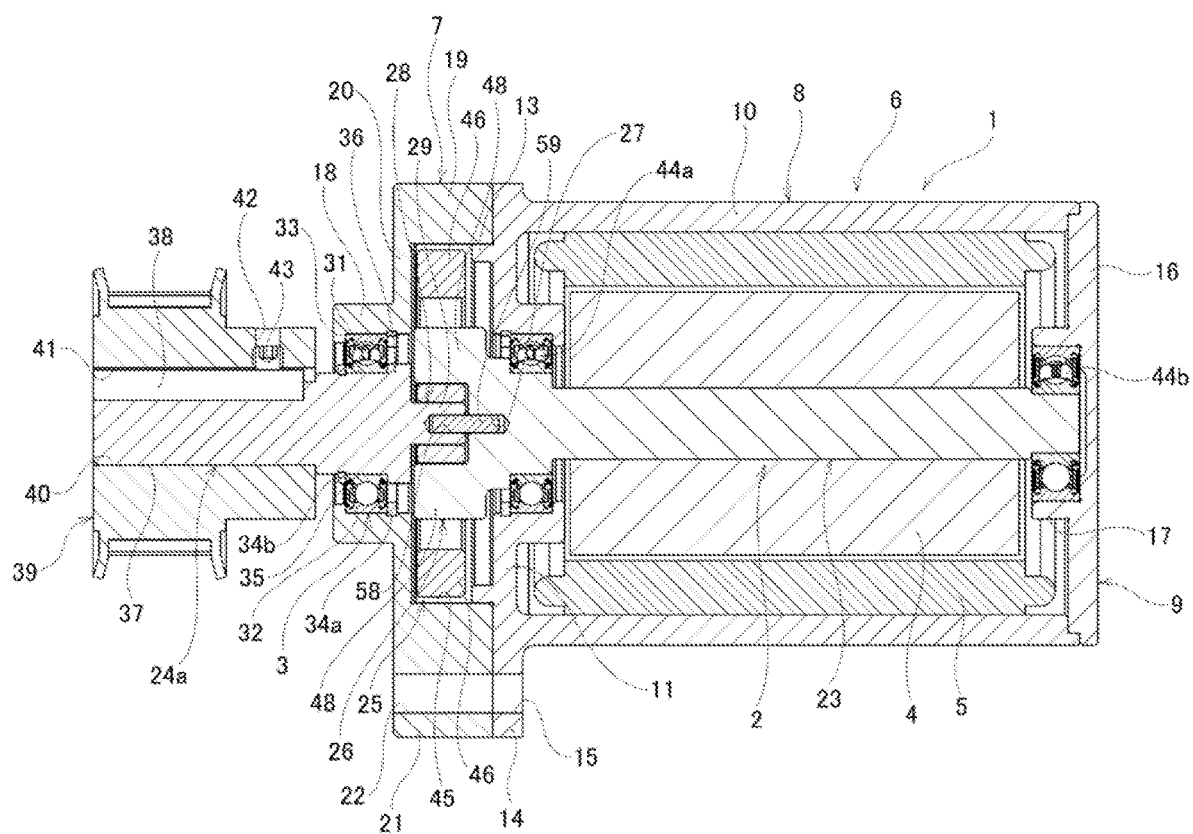
FIG. 15 is a cross-sectional view illustrating an electric motor with a reverse input cutoff clutch according to a second example of an embodiment of the present invention.

FIG. 15 illustrates a second example of an embodiment of the present invention. In this example, the second shaft 24a includes a cylindrical support concave portion 58 at the central portion of the end surface on the other side in the axial direction. A pin 59 is press fitted into the support concave portion 58. In this example, by internally fitting (in-row fitting) a portion of the pin 59 that protrudes from the end surface on the other side in the axial direction of the second shaft 24a in the shaft-side concave portion 27 of the first shaft 23 so that there is no looseness in the radial direction, coaxiality is ensured between the first shaft 23 and the second shaft 24a.

With the electric motor with a reverse input cutoff clutch of this example, when compared with a structure such as in the first example in which the shaft-side convex portion 30 is integrally formed on the second shaft 24, the manufacturing cost may be reduced. The configuration and operational effects of the other portions are the same as in the first example.

Third Example

Figure 16:
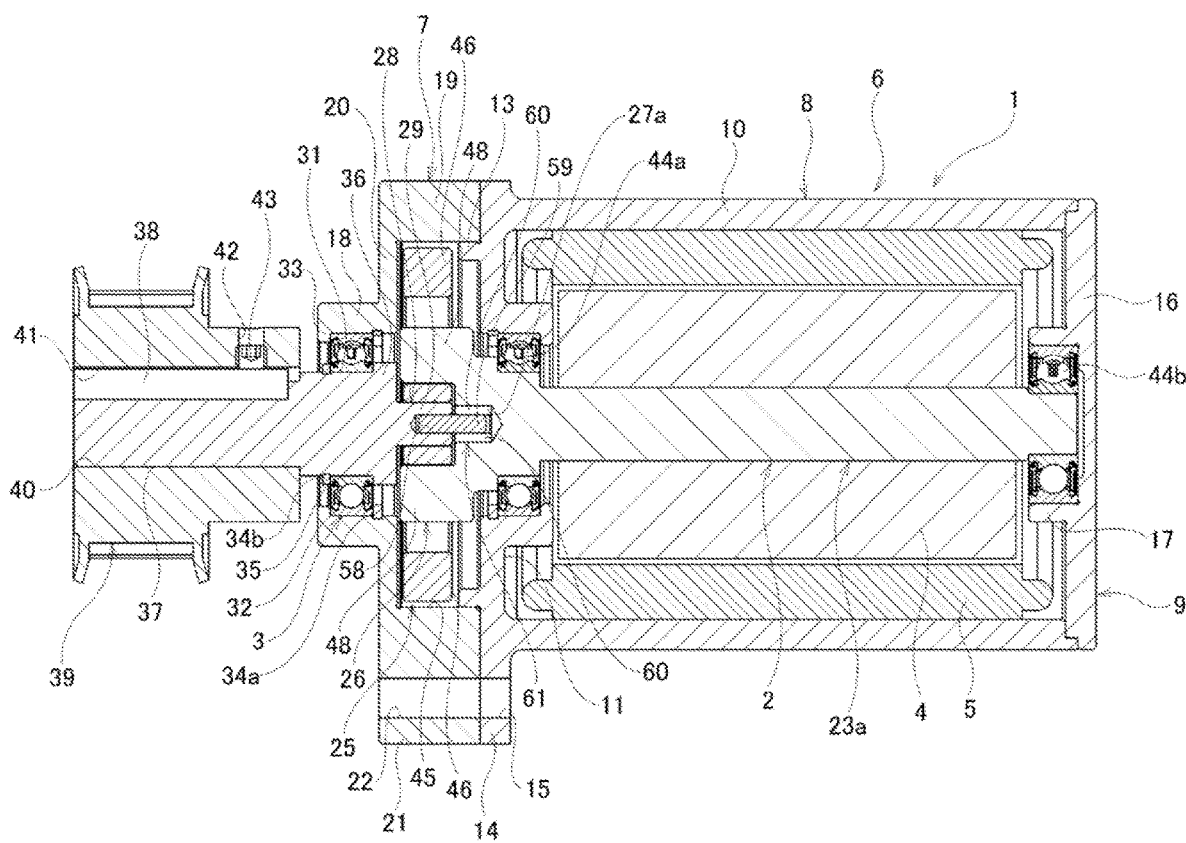
FIG. 16 is a cross-sectional view illustrating an electric motor with a reverse input cutoff clutch according to a third example of an embodiment of the present invention.

FIG. 16 illustrates a third example of an embodiment of the present invention. In this example, the second shaft 24a includes a cylindrical support concave portion 58 at the central portion of the end surface on the other side in the axial direction, and includes a pin 59 that is press-fitted into the support concave portion 58. A portion of the pin 59 that protrudes from the end surface on the other side in the axial direction of the second shaft 24a is inserted into the shaft-side recess 27a of the first shaft 23a, a plurality of needles (rollers) 60 are provided in a portion between the pin 59 and the shaft-side concave portion 27a, and thus a radial needle bearing 61 is arranged in that portion.

With the electric motor with a reverse input cutoff clutch of this example, when compared with the structure of the second example, the resistance to relative rotation of the second shaft 24a to the first shaft 23a may be kept small. The configuration and operational effects of the other portions are the same as in the first example and second example.

Fourth Example

Figure 17:
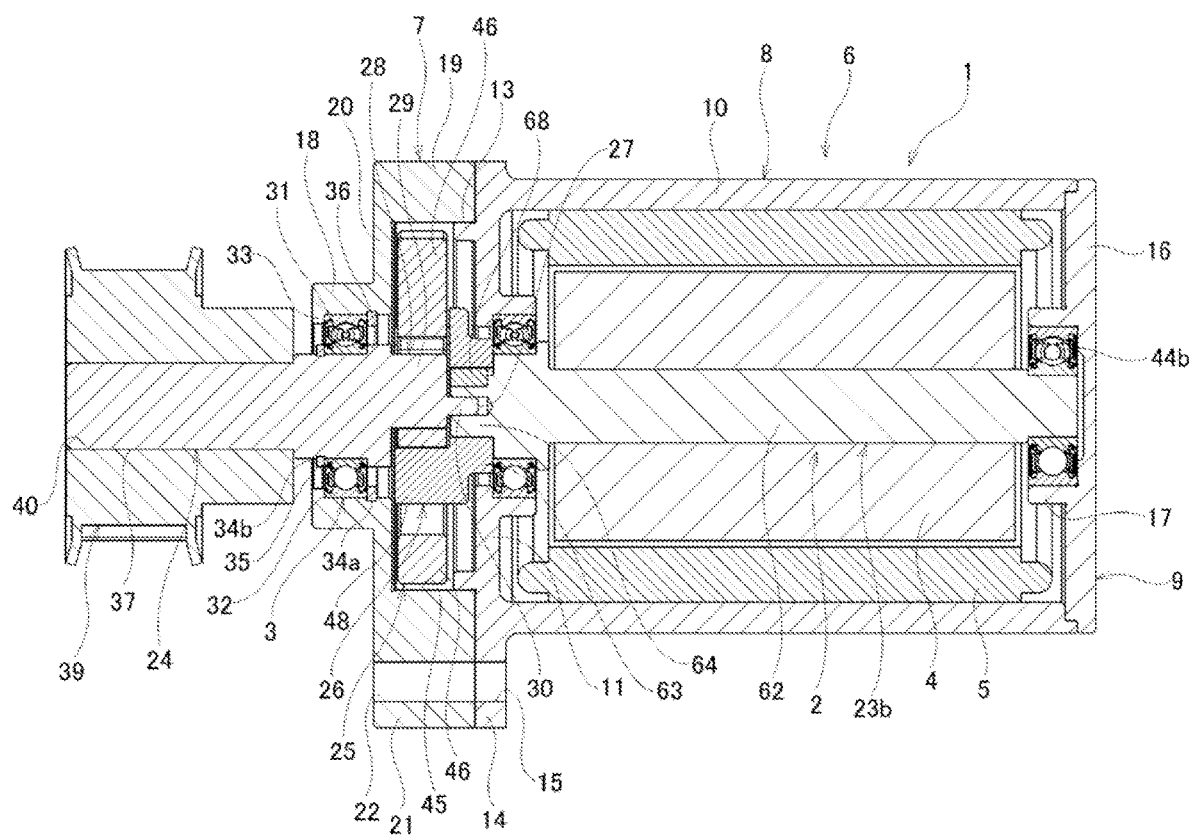
FIG. 17 is a cross-sectional view illustrating an electric motor with a reverse input cutoff clutch according to a fourth example of an embodiment of the present invention.
Figure 18:
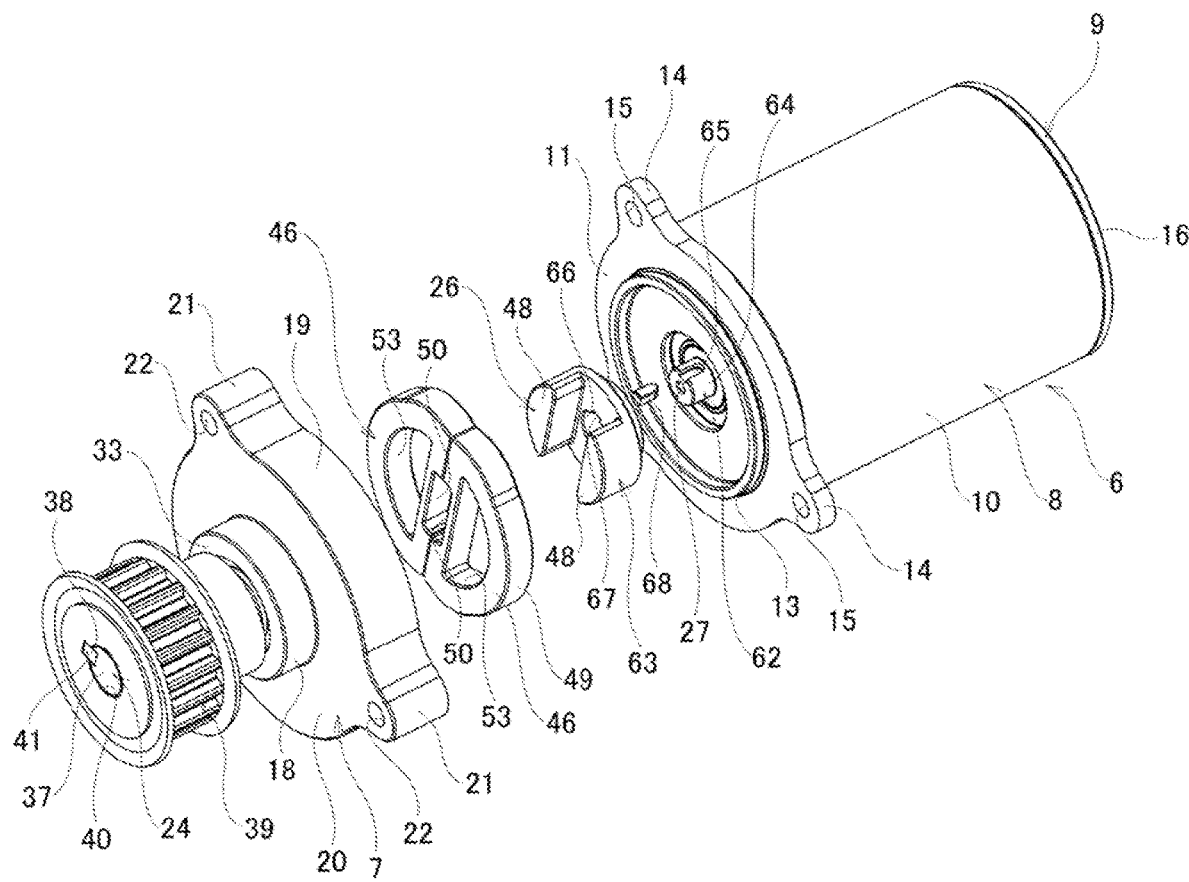
FIG. 18 is an exploded perspective view of the electric motor with a reverse input cutoff clutch according to the fourth example.
Figure 19:
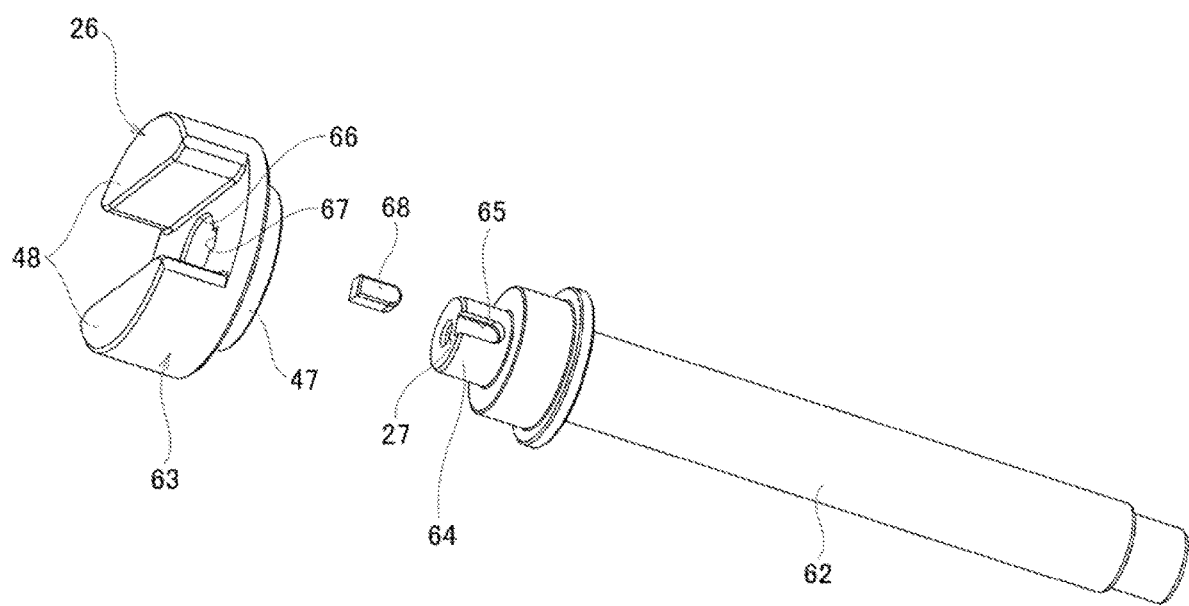
FIG. 19 is an exploded perspective view of a first shaft taken out from the electric motor with a reverse input cutoff clutch according to the fourth example.

FIG. 17 to FIG. 19 illustrate a fourth example of an embodiment of the present invention. In this example, the first shaft 23b is formed by coupling a main shaft body 62 and an input member 63 in the axial direction. The shaft main body 62 is such that the portion on the other side in the axial direction is rotatably supported inside the first housing element 6 of the housing 1 by a pair of bearings 44a and 44b on the other side portion in the axial direction. Moreover, the shaft main body 62 includes a fitting shaft portion 64 on the end portion on the one side in the axial direction, and includes an inner-diameter-side notch 65 at one location in the circumferential direction of the fitting shaft portion 64. Furthermore, the input member 63 includes an input portion 26. The input member 63 further includes a fitting hole 66 that penetrates in the axial direction through the central portion of the input shaft portion 47 of the input portion 26, and an outer-diameter-side notch 67 formed at one location in the circumferential direction of the fitting hole 66.

In this invention, the first shaft 23b is configured by coupling the main shaft body 62 and the input member 63 by internally fitting the fitting shaft portion 64 into the fitting hole 66, matching the phases of the inner-diameter-side notch 65 and the outer-diameter-side notch 67 in the circumferential direction and press-fitting a wedge piece 68 into the inner-diameter-side notch portion 65 and the outer-diameter-side notch portion 67.

Unlike the first shaft 23 of the first example, the first shaft 23b of this example does not have an input portion 26 directly formed at an end portion on the one side in the axial direction. Therefore, a general-purpose part may be used instead of a dedicated part as the first shaft 23b. The configuration and operational effects of the other portions are the same as in the first example.

Fifth Example

Figure 20:
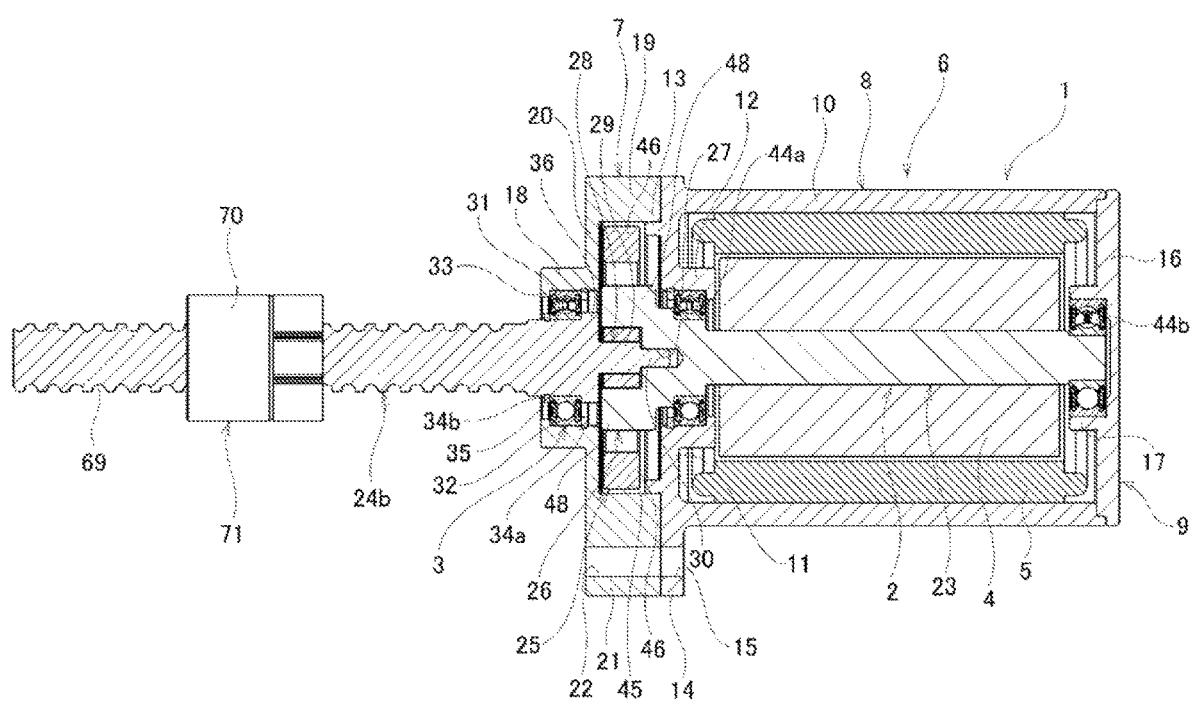
FIG. 20 is a cross-sectional view illustrating an electric motor with a reverse input cutoff clutch according to a fifth example of an embodiment of the present invention.
Figure 21:
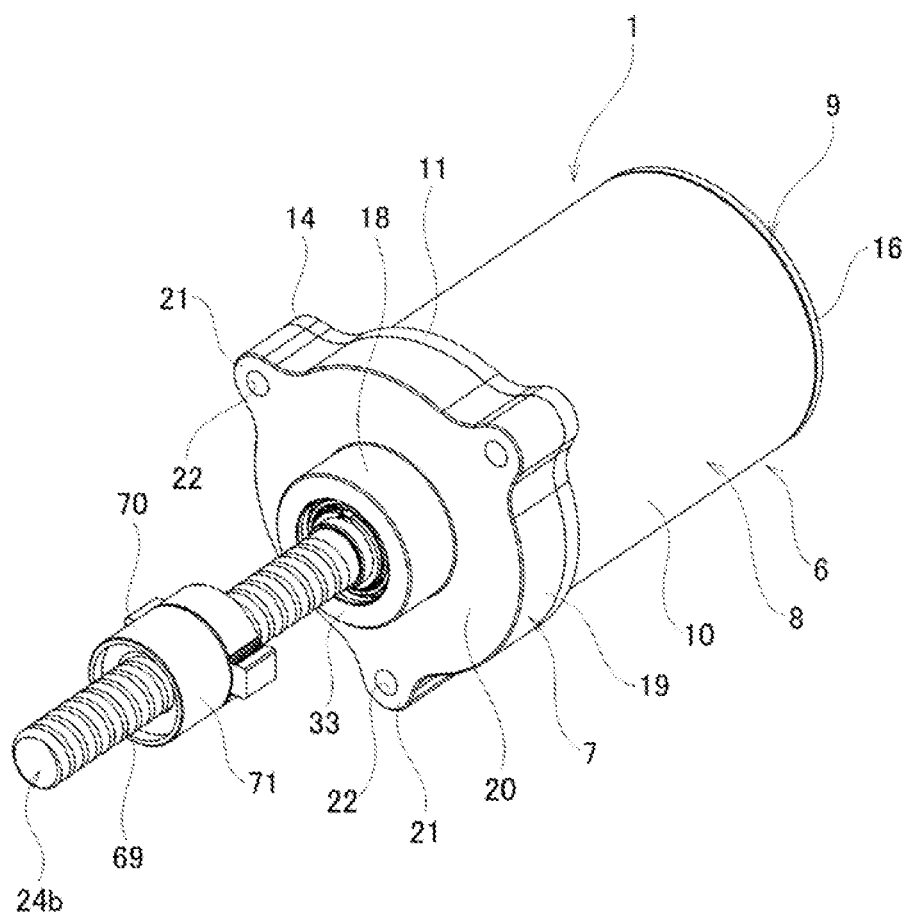
FIG. 21 is a perspective view illustrating the electric motor with a reverse input cutoff clutch according to the fifth example.

FIG. 20 and FIG. 21 illustrate a fifth example of an embodiment of the present invention. In the reverse input cutoff clutch of the first example, the second shaft 24 has a fitting shaft portion 37 at an end portion on the one side in the axial direction, and the pulley 39 is externally fitted on and supported by the fitting shaft portion 37. Then, power is transmitted to the displacement member by placing an endless belt around the pulley 39.

On the other hand, in this example, the second shaft 24b includes a male thread groove 69 formed in a spiral shape on the outer-circumferential surface of the portion on the one side in the axial direction. A nut 70, which is a displacement member, is arranged around a portion on the one side in the axial direction of the second shaft 24b. The nut 70 has a female thread groove on the inner-circumferential surface. In this example, a feed screw mechanism 71 is configured by arranging a plurality of balls between the male thread groove 69 and the female thread groove.

The electric motor with a reverse input cutoff clutch of this example may also be easily downsized for the same reason as the structure of the first example. The configuration and operational effects of the other portions are the same as in the first example.

Sixth Example

Figure 22:
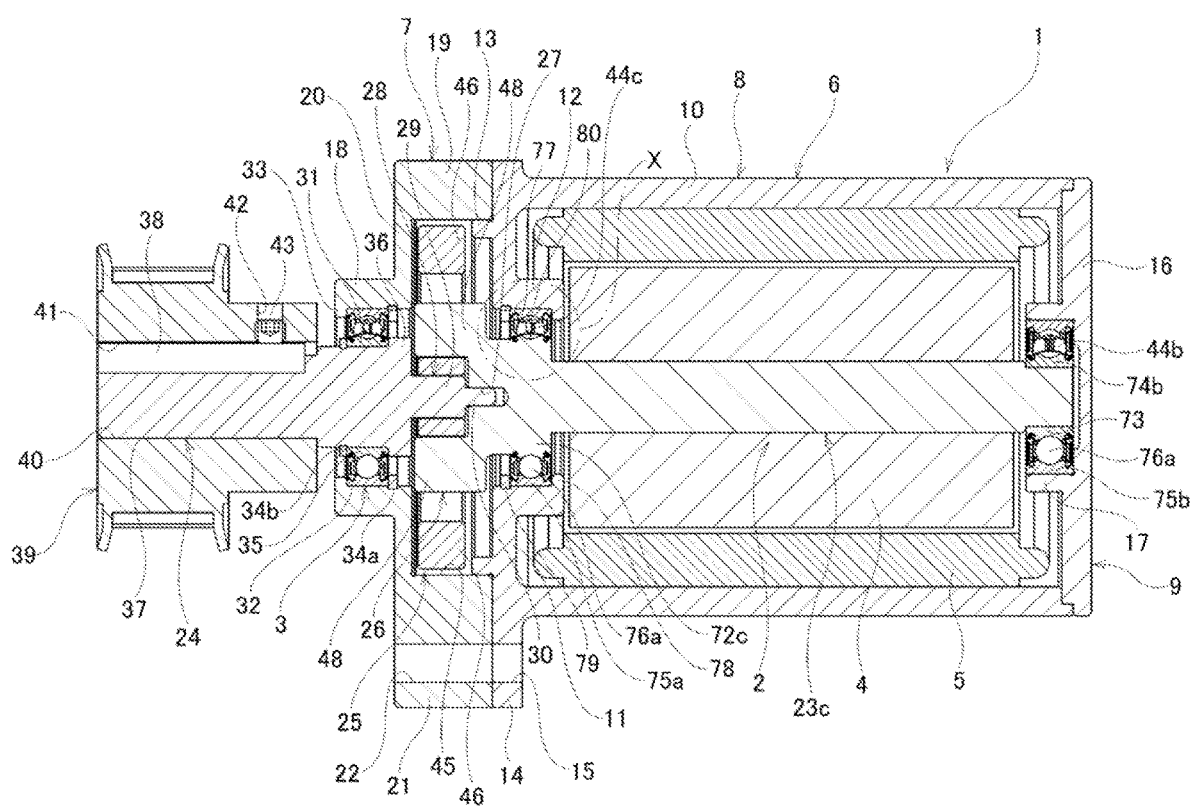
FIG. 22 is a cross-sectional view illustrating an electric motor with a reverse input cutoff clutch according to a sixth example of an embodiment of the present invention.
Figure 23:
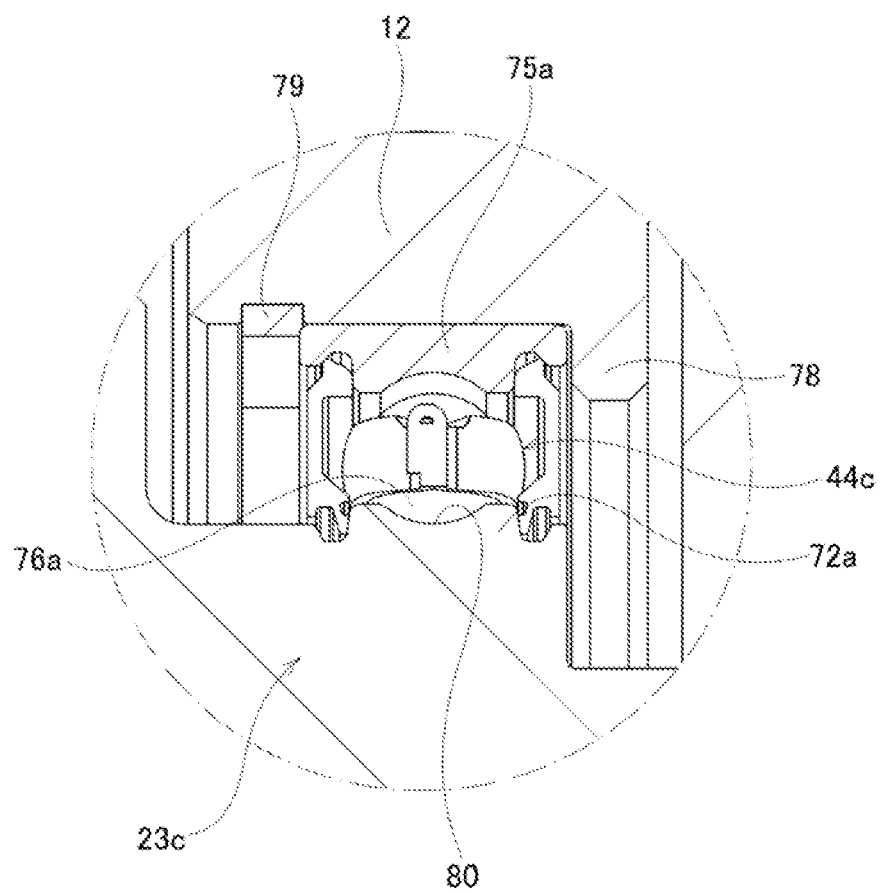
FIG. 23 is an enlarged view of part X of FIG. 22.

FIG. 22 and FIG. 23 illustrate a sixth example of an embodiment of the present invention. In this example, the inner ring raceway 80 of the bearing 44c that rotatably supports the end portion on the one side in the axial direction of the first shaft 23c with respect to the main body portion 8 of the housing 1 is directly formed on the outer-circumferential surface of the intermediate-diameter portion 72a that exists in the intermediate-diameter portion in the axial direction of the first shaft 23c.

According to this example, there is no need to form a stepped surface 77 on the first shaft 23 for coming in contact with the end surface on the one side in the axial direction of the inner ring 74a of the bearing 44a on the one side in the axial direction as in the first example. Therefore, in comparison with the first shaft 23 of the first example, it is possible to shorten the dimension in the axial direction of the first shaft 23c by the amount not necessary for forming the stepped surface 77, and thus it is possible to easily downsize the electric motor with a reverse input cutoff clutch.

The bearing 44c on the one side in the axial direction of this example does not have an inner ring, and thus it is not necessary to adjust the position in the axial direction of the inner ring with respect to the first shaft 23c in order to adjust the preload applied to the bearing 44c, and therefore it is possible to prevent a decrease in rotation accuracy due to positional adjustment in the axial direction of the inner ring. The configuration and operational effects of the other portions are the same as in the first example.

REFERENCE SIGNS LIST

1 Housing
2 Output shaft
3 Radial bearing
4 Rotor
5 Stator
6 First housing element
7 Second housing element
8 Main body portion
9 Lid portion
10 Cylindrical portion
11 Circular ring portion
12 Holding cylindrical portion
13 Ridge
14 First flange portion
15 Circular hole
16 Bottom plate portion
17 Holding cylindrical portion
18 Small-diameter cylindrical portion
19 Large-diameter cylindrical portion
20 Side plate portion
21 Second flange portion
22 Screw hole
23, 23a, 23b, 23c First shaft
24, 24a, 24b Second shaft
25 Reverse input cutoff clutch
26 Input portion
27, 27a Shaft-side concave portion
28 Output portion
29 Output-portion-side engaging portion
30 Shaft-side convex portion
31 Support shaft portion
32 Outer ring
33 Outer-diameter-side flange portion
34a, 34b Retaining ring
35 Inner ring
36 Inner-diameter-side flange portion
37 Fitting shaft portion
38 Engaging ridge
39 Pulley
40 Fitting hole
41 Engaging concave groove
42 Through hole
43 Screw
44a, 44b, 44c Bearing
45 Pressed surface
46 Engaging element
47 Input shaft portion
48 Input-portion-side engaging portion
49 Pressing surface
50 Engaging-element-side output engaging portion
51 Bottom surface
52 Side surface
53 Engaging-element-side input engaging portion
54 Double-row angular ball bearing
55 Male spline portion
56 Gear
57 Sprocket
58 Support concave portion
59 Pin
60 Needle
61 Radial needle bearing
62 Main shaft body
63 Input member
64 Fitting shaft portion
65 Inner-diameter-side notch portion
66 Fitting hole
67 Outer-diameter-side notch portion
68 Wedge piece
69 Male thread groove
70 Nut
71 Feed screw mechanism
72, 72a Intermediate-diameter portion
73 Small-diameter portion
74a, 74b Inner ring
75a, 75b Outer ring
76a, 76b Rolling body
77 Stepped surface
78 Inward-facing flange
79 Retaining ring
80 Inner ring raceway

The invention claimed is:

1. An electric motor with a reverse input cutoff clutch comprising:
   a housing;
   an output shaft having a first shaft rotatably supported inside of the housing; a second shaft coaxially arranged with the first shaft; and the reverse input cutoff clutch arranged inside the housing and connecting the first shaft and the second shaft;
   one radial bearing rotatably supporting the second shaft with respect to the housing;
   a rotor arranged around the first shaft and integrally rotating with the first shaft; and
   a stator coaxially arranged with the rotor and supported by and fixed to the housing;
   wherein
   the reverse input cutoff clutch has a function that, in a case where rotational torque is inputted to the first shaft, transmits the rotational torque that is inputted to the first shaft to the second shaft, and in a case where rotational torque is reversely inputted to the second shaft, completely cuts off the rotational torque that is reversely inputted to the second shaft, or transmits a part of the rotational torque that is reversely inputted to the second shaft to the first shaft, and cuts off the remaining part,
   the housing comprises a first housing element that stores the stator, a second housing element that stores the reverse input cutoff clutch, and a housing positioning means for positioning the first housing element and the second housing element in the radial direction, and
   the housing positioning means includes an uneven fitting portion of a housing-side concave portion of one housing element of the first housing element and the second housing element, and a housing-side convex portion of the other housing element of the first housing element and the second housing element.

2. The electric motor with the reverse input cutoff clutch according to claim 1, wherein
   the one radial bearing is a radial rolling bearing.

3. The electric motor with the reverse input cutoff clutch according to claim 2, wherein
the one radial bearing is a single-row deep groove ball bearing.

4. The electric motor with the reverse input cutoff clutch according to claim 1, wherein
one shaft of the first shaft and the second shaft has a cylindrical shaft-side concave portion in a central portion of an end surface in the axial direction, the other shaft of the first shaft and the second shaft has a shaft-side convex portion that internally fits in the shaft-side concave portion so that relative rotation is possible and with no looseness in a radial direction thereof.

5. The electric motor with the reverse input cutoff clutch according to claim 1, wherein
one shaft of the first shaft and the second shaft has a cylindrical shaft-side concave portion in a central portion of an end surface in the axial direction, the other shaft of the first shaft and the second shaft has a shaft-side convex portion that is inserted inside in the shaft-side concave portion, and the output shaft has a rolling bearing arranged between the inner-circumferential surface of the shaft-side concave portion and the outer-circumferential surface of the shaft-side convex portion.

6. An electric motor with a reverse input cutoff clutch comprising:
a housing;
an output shaft having a first shaft rotatably supported inside of the housing; a second shaft coaxially arranged with the first shaft and the reverse input cutoff clutch arranged inside the housing and connecting the first shaft and the second shaft;
one radial bearing rotatably supporting the second shaft with respect to the housing;
a rotor arranged around the first shaft and integrally rotating with the first shaft; and
a stator coaxially arranged with the rotor and supported by and fixed to the housing;
wherein
the reverse input cutoff clutch has a function that, in a case where rotational torque is inputted to the first shaft, transmits the rotational torque that is inputted to the first shaft to the second shaft, and in a case where rotational torque is reversely inputted to the second shaft, completely cuts off the rotational torque that is reversely inputted to the second shaft, or transmits a part of the rotational torque that is reversely inputted to the second shaft to the first shaft, and cuts off the remaining part,
wherein
the reverse input cutoff clutch comprises:
a pressed surface;
an input portion integrally rotating with the first shaft;
an output portion coaxially arranged with the input portion, and integrally rotating with the second shaft; and
an engaging element that, in a case where rotational torque is inputted to the input portion, moves in a direction away from the pressed surface due to engagement with the input portion, and by engaging with the output portion, transmits the rotational torque inputted to the input portion to the output portion; and in a case where rotational torque is reversely inputted to the output portion, moves in a direction approaching the pressed surface due to engagement with the output portion, and by coming in contact with the pressed surface, completely cuts off the rotational torque reversely inputted to the output portion, or transmits a part of the rotational torque reversely inputted to the output portion and cuts off the remaining part.

7. The electric motor with the reverse input cutoff clutch according to claim 6, wherein
the engaging element is arranged between the pressed surface and an output-portion-side engaging portion provided on the output portion; and an input-portion-side engaging portion provided in a portion of the input portion that is separated in the radial direction from the rotation center engages with an engaging-element-side input engaging portion provided on the engaging element so that the engaging-element-side input engaging portion can move away from or toward the pressed surface.

8. The electric motor with the reverse input cutoff clutch according to claim 7, wherein
the engaging element includes a plurality of engaging elements that are arranged to hold the output-portion-side engaging portion from outside in the radial direction.

9. The electric motor with the reverse input cutoff clutch according to claim 7, wherein
the engaging element includes a pair of engaging elements that are arranged to hold the output-portion-side engaging portion by bottom surfaces thereof.

10. The electric motor with the reverse input cutoff clutch according to claim 6, wherein
the input portion is integrally formed with the first shaft, and the output portion is integrally formed with the second shaft.

11. The electric motor with the reverse input cutoff clutch according to claim 6, wherein
the housing has the pressed surface on an inner-circumferential surface thereof.

* * * * *